(12) United States Patent
Cho et al.

(10) Patent No.: US 7,068,593 B2
(45) Date of Patent: Jun. 27, 2006

(54) APPARATUS AND METHOD FOR SYNCHRONIZING FREQUENCY IN ORTHOGONAL FREQUENCY DIVISION MULTIPLEXING COMMUNICATION SYSTEM

(75) Inventors: Yong Soo Cho, Seoul (KR); Kyung Won Park, Hwasun-gun (KR)

(73) Assignee: Chung-Ang University Industry Academic Cooperation Foundation, Seoul (KR)

( * ) Notice: Subject to any disclaimer, the term of this patent is extended or adjusted under 35 U.S.C. 154(b) by 827 days.

(21) Appl. No.: 09/994,568

(22) Filed: Nov. 26, 2001

(65) Prior Publication Data
US 2002/0145971 A1    Oct. 10, 2002

(30) Foreign Application Priority Data
Feb. 8, 2001    (KR)    .............................. 2001-006196

(51) Int. Cl.
*H04J 11/00*    (2006.01)
(52) U.S. Cl. ..................... 370/208; 370/210; 375/260; 375/344; 375/355
(58) Field of Classification Search ................ 370/208, 370/314, 315, 475, 231, 236, 350, 210, 503, 370/329, 347, 204; 345/7; 375/344, 347, 375/341, 260, 232, 364, 366
See application file for complete search history.

(56) References Cited

U.S. PATENT DOCUMENTS

| | | | |
|---|---|---|---|
| 5,414,729 A | * 5/1995 | Fenton | ........................ 375/149 |
| 5,452,015 A | * 9/1995 | Hulyalkar | ................... 348/608 |
| 5,602,835 A | 2/1997 | Seki et al. | |
| 5,956,624 A | * 9/1999 | Hunsinger et al. | ............. 455/65 |
| 6,069,583 A | * 5/2000 | Silvestrin et al. | ...... 342/357.01 |
| 6,430,148 B1 | * 8/2002 | Ring | .......................... 370/208 |

OTHER PUBLICATIONS

Kobayashi, H.; A novel coherent demodulation for M-QAM OFDM signal operating in the burst mode;□□Vehicular Technology Conference, 2000. IEEE VTS-Fall VTC 2000. 52nd□□vol. 3, Sep. 24-28, 2000 pp. 1387-1391 vol.□□.*

(Continued)

*Primary Examiner*—Alpus H. Hsu
*Assistant Examiner*—Prenell Jones
(74) *Attorney, Agent, or Firm*—Greenblum & Bernstein, P.L.C.

(57) ABSTRACT

A frequency synchronization apparatus for an orthogonal frequency division multiplexing (OFDM) communication system includes a radio frequency (RF) receiving module for receiving OFDM signal, an analog/digital (A/D) converter connected to the RF receiving module, the A/D converter converting the OFDM signal into a digital signal, a frequency synchronization module connected to the A/D converter, the frequency synchronization module synchronizing carrier frequency, a Fast Fourier Transformer (FFT) connected to the frequency synchronization module, the FFT performing fast Fourier transformation to symbols from the frequency synchronization module, a channel estimation module connected to the FFT, the channel estimation module estimating channel response, an equalizer connected to the FFT and the channel estimation module, the equalizer equalizing channel, a residual phase tracking module connected to the equalizer, the residual phase tracking module tracking residual phase, a demodulator connected to the residual phase tracking module, the demodulator demodulating, and a controller connected to the frequency synchronization module, the controller controlling the frequency synchronization module.

38 Claims, 15 Drawing Sheets

OTHER PUBLICATIONS

Abhayawardhana, V.S.; Wassell, I.J.; Residual frequency offset correction for coherently modulated OFDM systems in wireless communication; Vehicular Technology Conference, 2002. VTC Spring 2002. IEEE 55th vol. 2, May 6-9, 2002 pp. 777-781 vol. 2.*

* cited by examiner

FIG. 1B

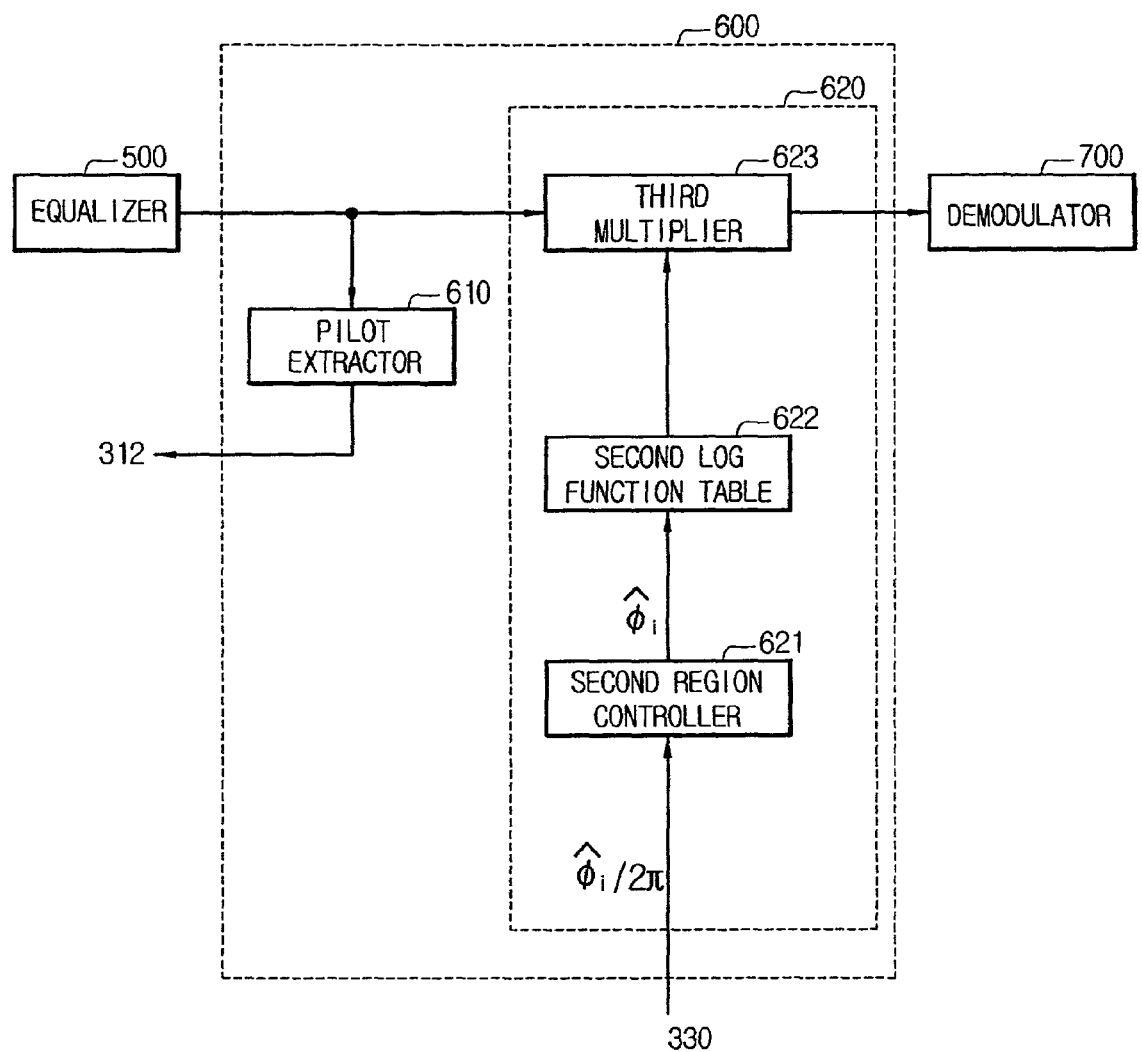

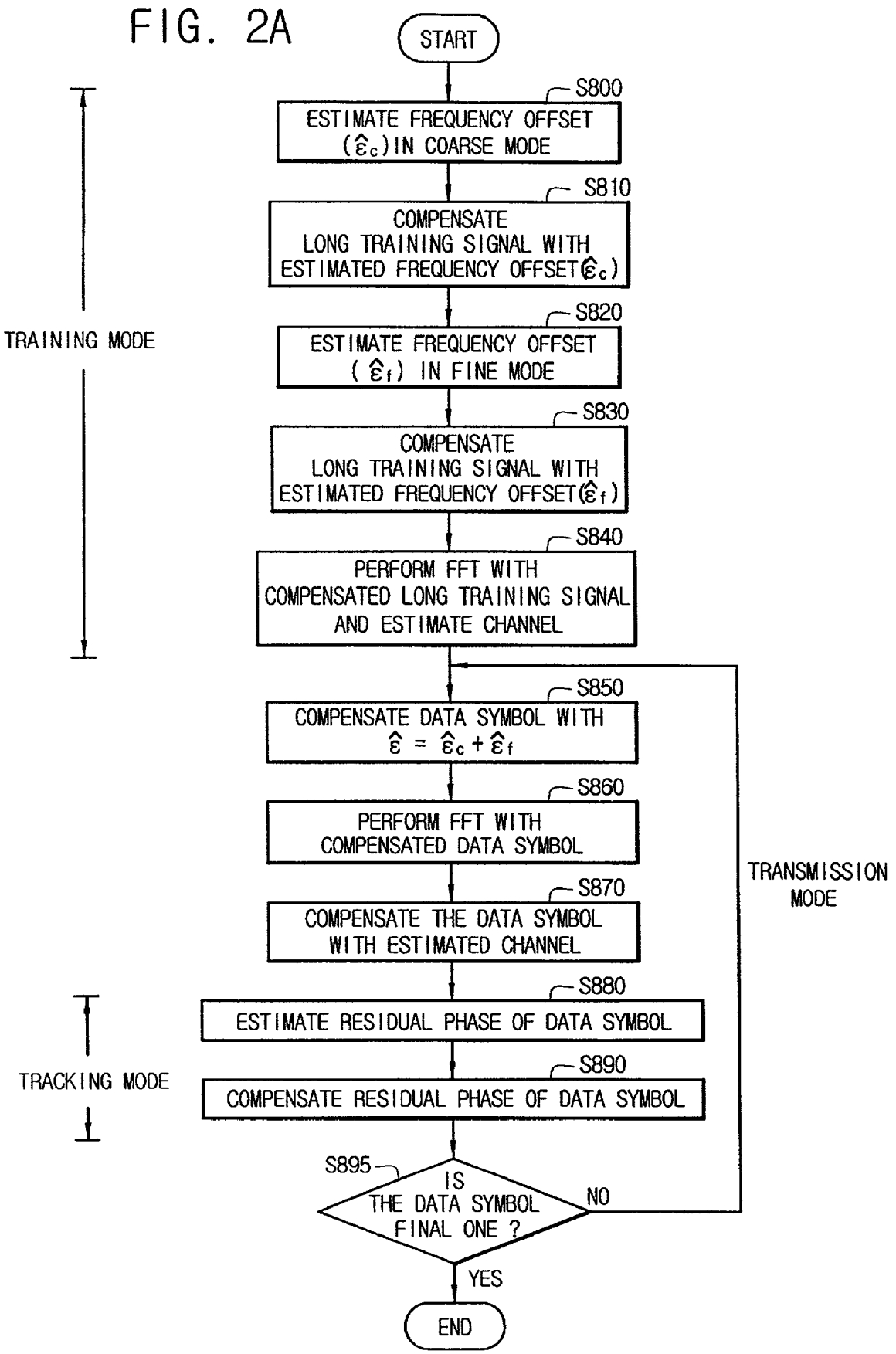

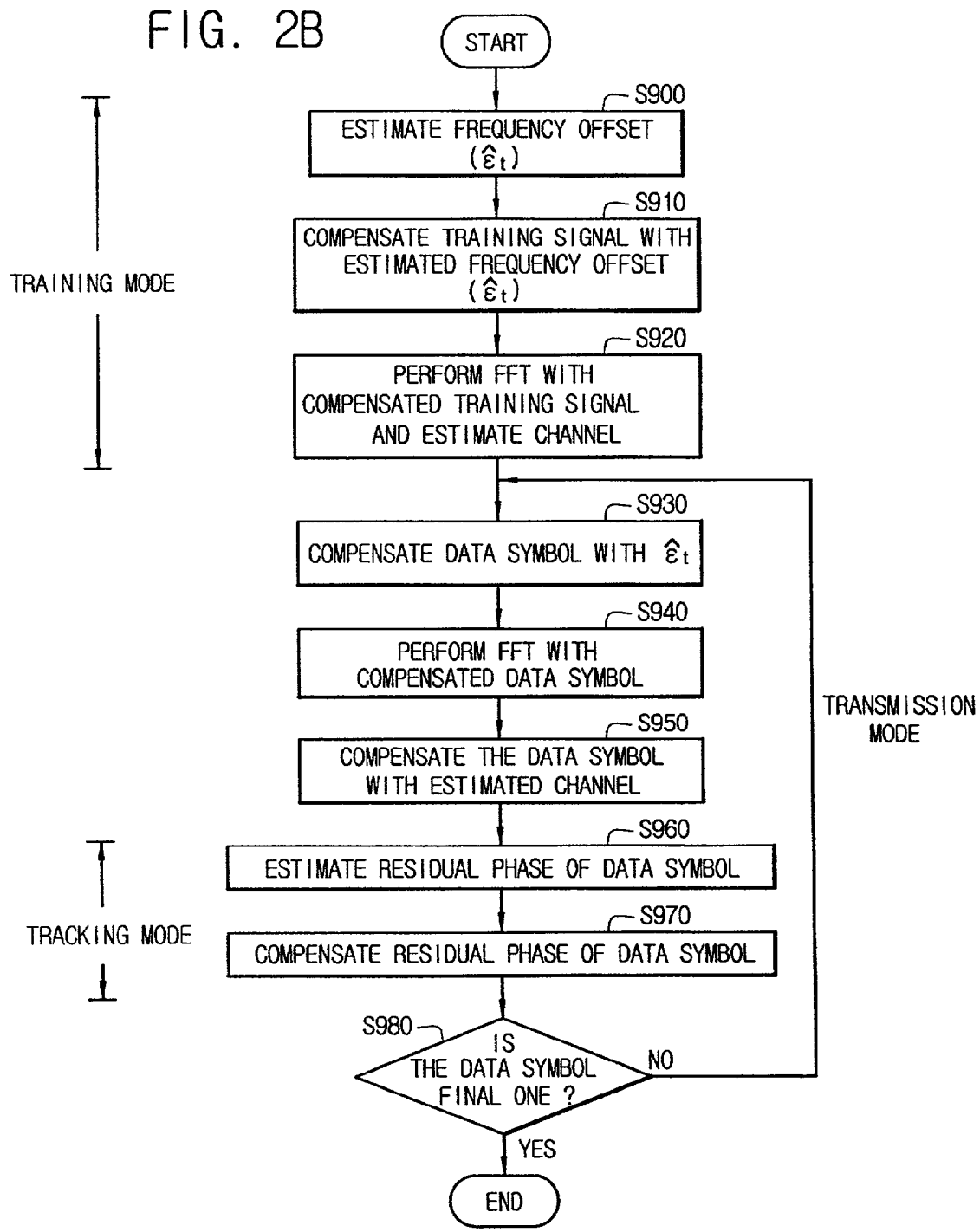

FIG. 9
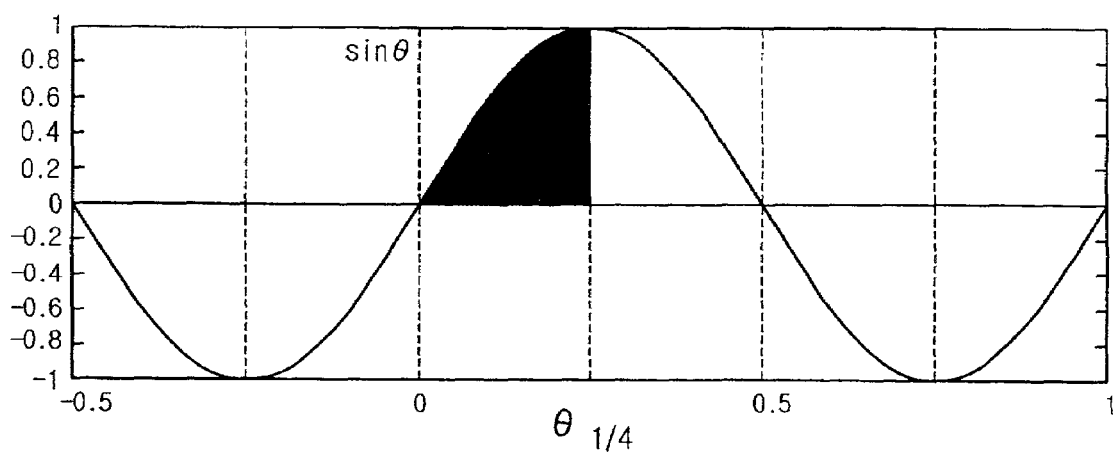
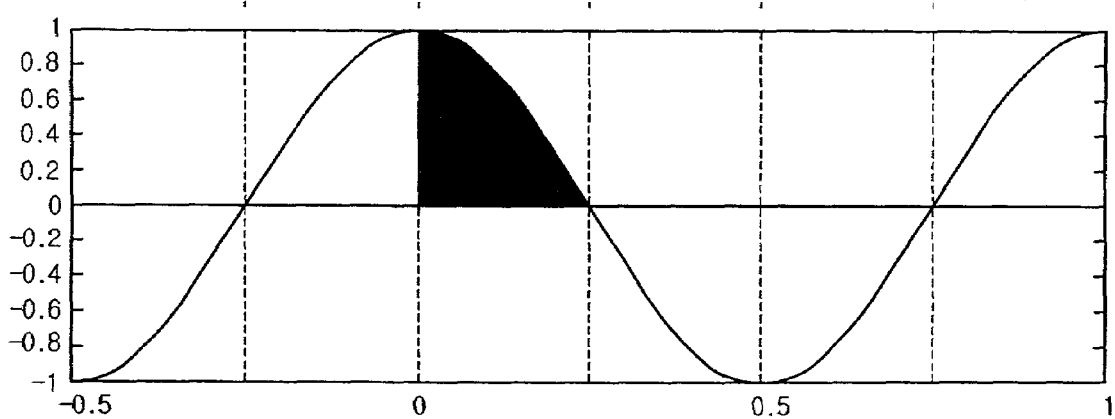

APPARATUS AND METHOD FOR SYNCHRONIZING FREQUENCY IN ORTHOGONAL FREQUENCY DIVISION MULTIPLEXING COMMUNICATION SYSTEM

BACKGROUND OF THE INVENTION (a) Field of the Invention

The present invention relates to an apparatus and method for frequency synchronization, and in particular, to an apparatus and method for completely synchronizing carrier frequency through a digital process in an orthogonal frequency division multiplexing (OFDM) wireless communication system.

(b) Description of the Related Art

In OFDM, original data stream is multiplexed into N parallel data streams each of the data streams modulated with a different frequency using an Inverse Fast Fourier Transform (IFFT), and the resulting signals are transmitted together in the same band.

The OFDM symbols are artificially prolonged by periodically repeating a guard interval which is longer than a maximum channel delay so as to remove the reflections of previous symbols, which preserves the orthogonality such that inter symbol interferences (ISI) and inter channel interference are reduced.

Successful OFDM reception requires that a receiver maintains correct symbol synchronization which means that the receiver knows at which point of time each symbol begins and ends.

Maintaining the symbol synchronization is difficult if a transmitter and receiver are moving with respect to each other. For example, if a mobile station moves around in an urban environment, the propagation path of the signal changes constantly, resulting in attenuation and reflection. Also, the mobile station moving fast causes phase jitter and Doppler shift, resulting in frequency offset which means difference in frequency between the transmitter and receiver. This frequency offset causes inter symbol interference and damages the orthogonality condition required among the subcarriers, resulting in degradation of bit error rate.

Accordingly, in order for the receiver to be able to successfully receive the symbols, the receiver has to synchronize carrier frequency between the transmitter and receiver before performing the Fast Fourier Transform (FFT).

To reduce the carrier frequency offset, a wireless modem adopting the OFDM modulation sends a training signal for channel estimation and initial frequency synchronization. The Wireless Local Area Network standards such as the HIPERLAN/2 developed by the European Telecommunications Standards Institute (ETSI) and the 802.11a of the Institute of Electrical and Electronics Engineers (IEEE) specify a short training sequence in which 16 samples are repeated 10 times and a long training sequence in which 64 time samples are repeated twice.

In the conventional synchronization method, the frequency synchronization device estimates the carrier frequency offsets using the training signals in digital domain and passes the signals through a loop filter so as to control a voltage controlled oscillator (VCO) such that the VCO output is used to synchronize the carrier frequency in analog domain.

In other cases, especially for single carrier transmission, a numerical controlled oscillator (NCO) is used for compensating the frequency offset in the digital domain.

However, in the carrier frequency synchronization method of the conventional OFDM system in which the carrier frequency synchronization is performed in analog domain, it is impossible to perform a precise carrier frequency synchronization since the carrier frequency synchronization is performed using the output of the VCO that is controlled by the signal generated by the estimated frequency offsets and this causes the synchronization time delay.

Also, in the conventional method, since the carrier frequency offset is estimated in digital domain and the frequency offset is compensated using the VCO in analog domain, its implementation and performance analysis are difficult in this mixed analog-digital mode.

As the implementation method for obtaining an arctangent and exponential function for synchronizing carrier frequency in digital domain, the techniques employing the Coordinate Rotation Digital Computer (CORDIC) and Look-up table are used.

However, the CORDIC method has a drawback in that the computing speed is slow and the precision is low despite of its simple implementation. On the other hand, the look-up table method requires lots of memory modules causing a hardware complexity and it is difficult to create addresses in look-up table in spite of its fast speed and high precision.

SUMMARY OF THE INVENTION

The present invention has been made in an effort to solve the above problems of the prior art.

It is an object of the present invention to provide a frequency synchronization apparatus and method for the orthogonal frequency division multiplexing (OFDM) communication system capable of synchronizing carrier frequency while maintaining a high precision of data reception regardless of the time delay by compensating frequency offsets in the digital domain.

It is another object of the present invention to provide a frequency synchronization apparatus and method for the OFDM communication system capable of precisely estimating the frequency offset in a broad estimation range using a coarse and fine modes.

It is another object of the present invention to provide a frequency synchronization apparatus and method for the OFDM communication system capable of tracking a residual phase by implementing the same hardware used in the coarse and fine mode estimation circuits so as to share in parts.

It is still another object of the present invention to provide a frequency synchronization apparatus and method for the OFDM communication system capable of performing computation with a high precision in simple hardware using a look-up table containing arctangent and log functions required for estimating and compensating the frequency offset.

To achieve the above objects, the frequency synchronization apparatus for an orthogonal frequency division multiplexing (OFDM) communication system according to the present invention comprises, a radio frequency (RF) receiving module for receiving OFDM signal, an analog/digital (A/D) converter connected to the RF receiving module, the A/D converter converting the OFDM signal into a digital signal, a frequency synchronization module connected to the A/D converter, a Fast Fourier Transformer (FFT) connected to the frequency synchronization module, a channel estimation module connected to the FFT, an equalizer connected to the FFT and the channel estimation module, a residual phase tracking module connected to the equalizer, a demodulator connected to the residual phase tracking module, and a controller connected to the frequency synchronization module.

BRIEF DESCRIPTION OF THE DRAWINGS

The accompanying drawings, which are incorporated in and constitute a part of the specification, illustrate an embodiment of the invention, and together with the description, serve to explain the principles of the invention.

FIG. 1b is a block diagram showing a frequency synchronization module of the frequency offset synchronization apparatus of FIG. 1a;

FIG. 1c is a block diagram showing a residual phase tracking module of the frequency synchronization apparatus of FIG. 1a;

FIG. 2a is a flow chart illustrating a frequency synchronization method of the OFDM communication system according to the referred embodiment of the present invention when using two training signals;

FIG. 2b is a flow chart illustrating the frequency synchronization method of the OFDM communication when using one training signal;

FIG. 9 a pair of drawings showing the sine and cosine waveforms;

DETAILED DESCRIPTION OF THE PREFERRED EMBODIMENTS

A preferred embodiment of the present invention will be described hereinafter with reference to the accompanying drawings. A frequency synchronization apparatus and method of the present invention will be explained by embodying in an OFDM wireless modem.

Figure 1A:
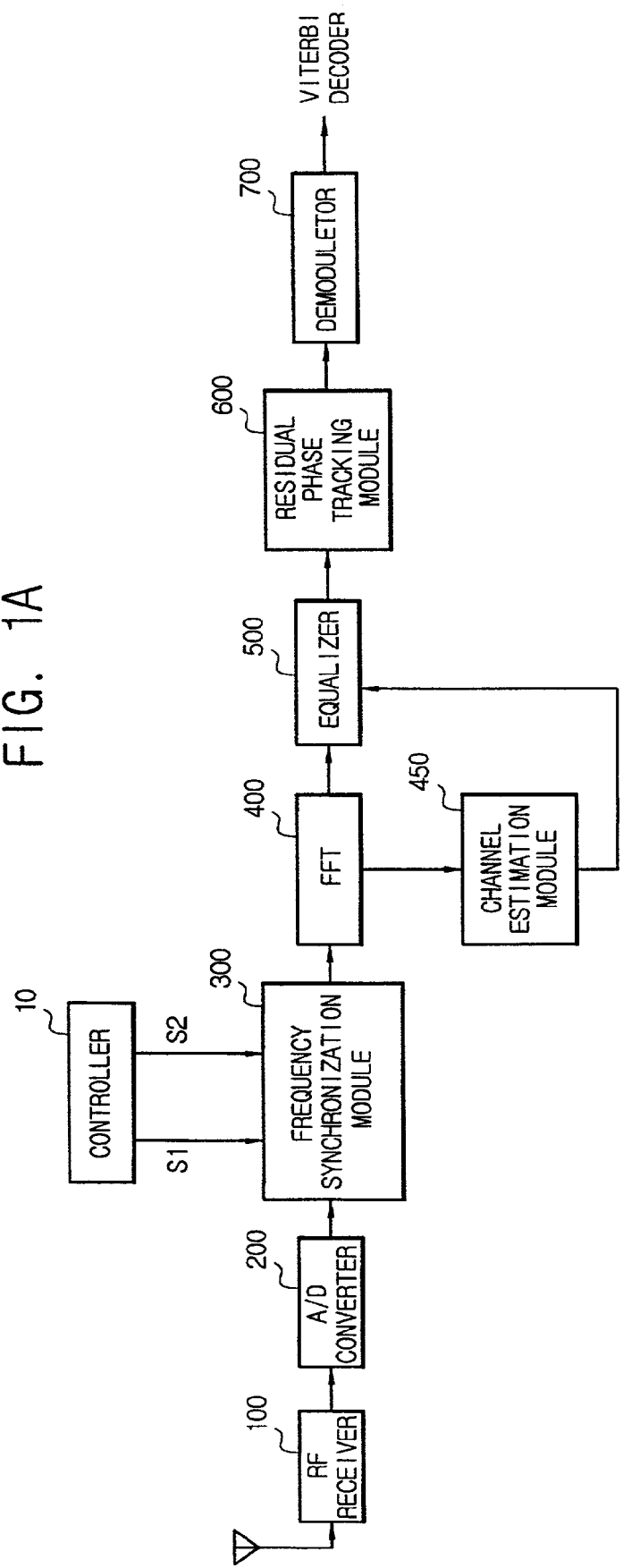
FIG. 1a is a block diagram showing a frequency synchronization apparatus in the orthogonal frequency division multiplexing (OFDM) communication system according to a preferred embodiment of the present invention.
Figure 1B:
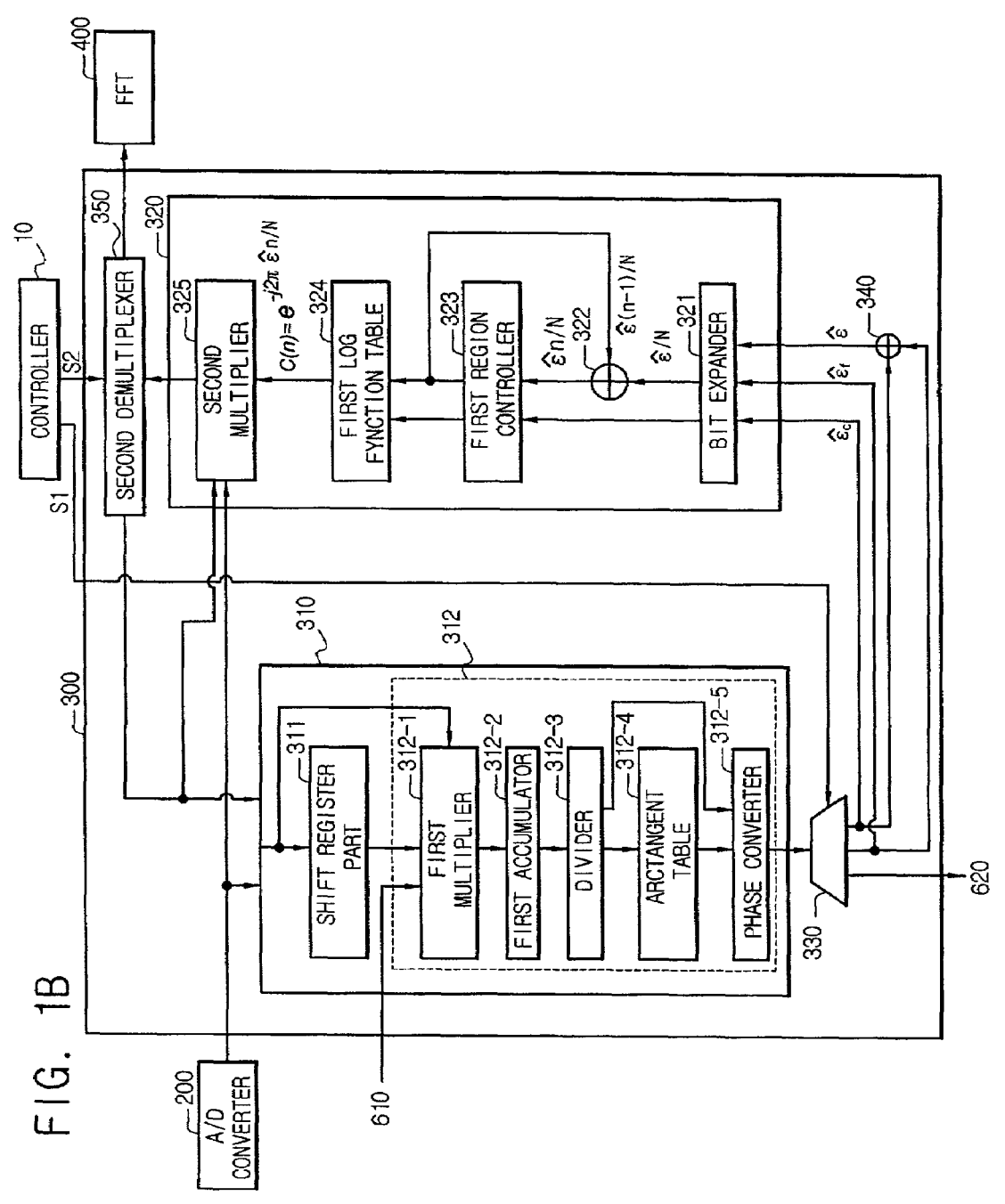
Figure 1D:
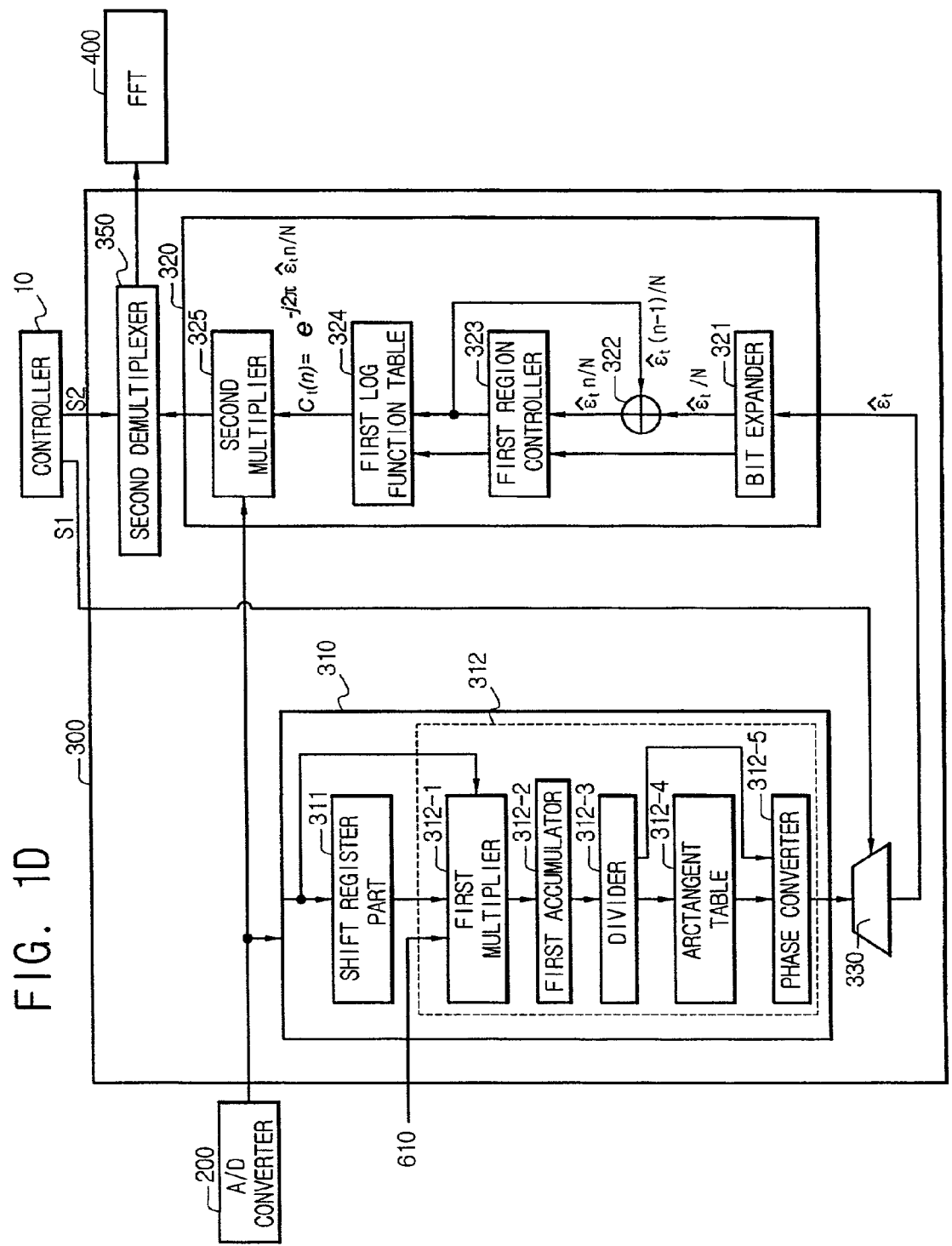
FIG. 1d is a block diagram illustrating the operation of the frequency synchronization part of FIG. 1b when using a single training signal.
Figure 1E:
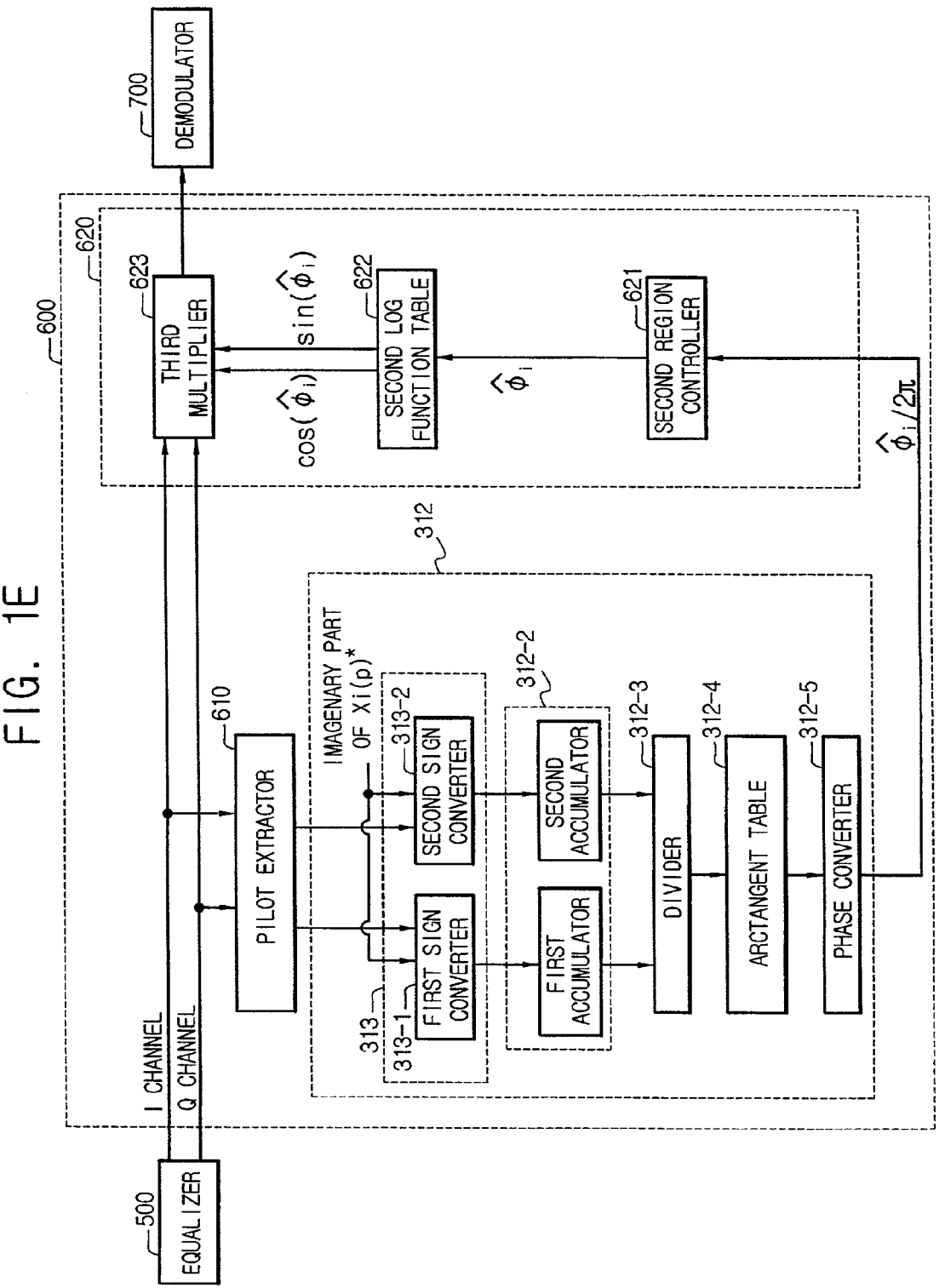
FIG. 1e is a block diagram illustrating the operation of the residual phase tracking module of FIG. 1c when a pilot signal is set to a predetermined value.

FIG. 1a, FIG. 1b, and FIG. 1c are respective block diagrams showing a frequency synchronization apparatus in the orthogonal frequency division multiplexing (OFDM) communication system according to a preferred embodiment of the present invention, frequency offset synchronization module of the frequency synchronization apparatus of FIG. 1a, a residual phase tracking module of the frequency synchronization apparatus of FIG. 1a. FIG. 1d and FIG. 1e are respective block diagrams illustrating the operation of the frequency synchronization module of FIG. 1b when using a single training signal, a block diagram illustrating the operation of the residual phase tracking module of FIG. 1c when a pilot signal is set to a predetermined value.

Referring to FIG. 1a~FIG. 1c, the frequency synchronization apparatus comprises a radio frequency (RF) receiving module 100 for receiving an OFDM signal transmitted by an OFDM transmitter, an A/D converter 200 connected to the RF receiving module 100 for converting the OFDM signal into a digital signal, a frequency synchronization module 300 connected to the A/D converter 200 for synchronizing a carrier frequency, a Fast Fourier Transformer (FFT) 400 connected to the frequency synchronization module 300 for performing the fast Fourier transformation on every symbol therefrom, a channel estimation module 450 connected to the FFT 400 for estimating channel, an equalizer 500 connected to the FFT 400, a residual phase tracking module 600 connected to the equalizer 500 for estimating the residual phase, and a demodulator 700 connected to the residual phase tracking module 600 for demodulating the modulated signal so as to reproduce the original signal.

The frequency synchronization module 300 comprises an estimation submodule 310 for estimating a frequency offset and residual phase of the received signal, a first demultiplexer 330 for selectively outputting the frequency offset and residual phase in accordance with a control signal from the controller 10, an adder 340 for adding the frequency offset from the estimation submodule, a frequency offset compensation submodule 320 for compensating the received signal and data symbol using the frequency offsets from the first demultiplexer 330 the adder 340, and a second demultiplexer 350 for selectively outputting the signal from the frequency offset compensation submodule 320 according to the control signal from the controller 10.

The estimation submodule 310 comprises a shift register part 311 for delaying a sample of the training signal and outputting conjugate complex numbers of a predetermined training signal and a following training signal at the same time, and a selective estimation part 312 for estimating the frequency offset of the signal from the shift register part 311 and a residual phase of the signal from the residual phase tracking module 600.

The selective estimation part 312 comprises a first multiplier 312-1 for multiplying the signals from the shift register part 311 or the residual phase tracking module 600, a first accumulator 312-2 for accumulating the samples obtained by calculation of the first conjugated complex number multiplier 312-1, a divider 312-3 for generating arctangent table address on the basis of ratio of a real part to imaginary part of a value accumulated at the accumulator 312-2, an arctangent table 312-4 stored arctangent values sampled in a predetermined interval so as to output a corresponding arctangent value to the arctangent table address generated by the divider, and a phase converter 312-5 for converting the arctangent value into a value of a corresponding region by referring to a sign of the accumulated value at the first accumulator 312-2 and outputting the value as an estimated frequency offset.

It is preferred that the arctangent values are classified into values of predetermined regions and the values in a representative one of the regions stored as representative values in the arctangent table 312-4.

The frequency offset compensation submodule 320 comprises a bit expander 321 for dividing the estimated frequency offset into samples of a predetermined size, a second accumulator for generating a first log function table address by accumulating frequency offset of each sample obtained at the bit expander 321, a first region controller 323 for identifying a sign of value at the bit expander and converting the first log function table address into a corresponding address value in a predetermined region and outputting the same, a first log function table 324 for outputting the log function value stored by sampling in a predetermined distance in accordance with the address value outputted from the first region controller 323, and a second multiplier 325 for compensating the frequency offset by multiplying the training signal or data symbol by the log function value outputted from the first log function table 324.

It is preferred that the sine and cosine values are divided into predetermined regions and one of the region is divided by a predetermined value and stored in the first log function table 324.

The first region controller 323 outputs an address value resulting from a subtraction of a predetermined value from the output value and then shift the present region to a next region. Also, the first region controller 323 outputs the output value of the second accumulator 322 using complementary operation for obtaining a sine or cosine value in a symmetric region.

The residual phase tracking module 600 estimates a residual phase using the selective estimation part 312 of the frequency offset synchronization module 300. The residual phase tracking module 600 comprises a pilot extractor 610 for extracting a pilot signal from the data symbol transformed by the Fourier Transform operation and sending the pilot signal to the selective estimation part 312, and a residual phase compensation part 620 for compensating the data symbol with the residual phase of the data symbol estimated at the selective estimation part 312.

The residual phase tracking compensation Dart 620 comprises a second region controller 621 for outputting a second log function table address corresponding to the residual phase value outputted from the first demultiplexer 330, a second log function table 622 for outputting a previously stored log function value, which is obtained by sampling in a predetermined interval, corresponding to the log function table address from the second region controller, and a third multiplier 623 for compensating the residual phase by multiplying the log function value outputted from the second log function table 622 with the compensated data symbol.

The sine and cosine values are divided into predetermined regions and then one of the regions is divided by a predetermined value so as to be stored in the second table 622.

The second region controller 621 outputs an address resulting from subtracting a predetermined value from the output value and then shifts the present address region to a next address region if the output value from the first demultiplexer 330 is greater than the predetermined value. Also, the second region controller 621 outputs an address obtained from the first demultiplexer 330 through a complementary operation for calculating the sine and cosine values in symmetry region.

FIG. 2a and FIG. 2b are flow charts illustrating frequency synchronization method of the OFDM communication system respectively when using two training signals and using one training signal.

Referring to FIG. 2a, the frequency synchronization method of the OFDM communication system comprises the steps of (A) estimating and compensating the frequency offset of the training signal, performing the Fast Fourier Transform (FFT), and estimating a channel (S800~S840); (B) compensating the data symbol of the received signal with the frequency offset estimated at step (A), performing the FFT, and then compensating the data symbol with the channel estimated at step (A) (S850~S870); and (C) estimating and compensating a residual phase of the channel-compensated data symbol (S880~895).

The step (A) comprises the sub-steps of (A1) estimating the frequency offset using a short training signal and compensating a long training signal with the estimated frequency offset when the received signal has the two kinds of training signals (S800~S810; coarse mode), (A2) re-estimating the frequency offset of the long training signal compensated at the sub-step A1 and re-compensating the long training signal (S820~830; fine mode).

At step (B), the data symbol is compensated by multiplying the exponential function with the frequency offsets estimated at the sub-steps (A1) and (A2), i.e., at the coarse and fine modes.

The sub-step (A1) comprises the stages of (A1-1) performing a conjugate complex number computation and accumulation thereof by delaying a sample of the short training signal, creating an arctangent table address by obtaining a ratio of real and imaginary parts of the accumulated value; and (A1-2) outputting estimated frequency offset by identifying a code of the accumulated value and transforming the arctangent value according to the arctangent table address to a corresponding region value; (A1-3) dividing the estimated frequency offset into predetermined sizes, accumulating them, and creating a first log function table address; (A1-4) transforming the first log function table address into a corresponding region address by identifying the accumulated code value of the stage (A1-3) and then outputting a log function value corresponding to the transformed address; and (A1-5) compensating the frequency offset by multiplying the long training signal with the log function value outputted at the stage (A1-4) (not shown).

The stage (A1-1) has a sub-stage of dividing the arctangent value into a predetermined regions and then dividing one of the regions by a predetermined value so as to be previously stored in the arctangent table.

The stage (A1-4) has a sub-stage of dividing the sine and cosine values into the predetermined regions and then one of the regions by a predetermined value so as to be previously stored in the first log function table, and outputting the sine and cosine values corresponding to the value resulting from subtracting a predetermined value from the accumulated value and shifting the present address region to the next region if the accumulated value is greater than the predetermined value.

At the stage (A1-3), the address value created for obtaining the sine or cosine value of the symmetric region is outputted after the complementary operation.

The sub-step (A2) comprises the stages of (A2-1) creating an arctangent table address by delaying sample of the frequency-compensated long training signal and performing the conjugate complex number calculation and accumulation thereof and obtaining the ratio of the real and imaginary parts of the accumulated value, (A2-2) outputting the estimated frequency offset by identifying the code of the accumulated value and transforming the arctangent value of the arctangent table address to the corresponding region value, (A2-3) accumulating the estimated frequency offset after dividing in the predetermined size and creating the log function table address, (A2-4) transforming the first log function table address to the corresponding region address by identifying the accumulated code value of the stage (A2-3) and then outputting the log function value corresponding to the transformed address, and (A2-5) compensating the frequency offset by multiplying the log function value outputted at the stage (A2-4) with the frequency-compensated long training signal of the step (A1) (not shown).

The stage (A2-1) has sub-stage of dividing the arctangent value into predetermined regions and then dividing one of the regions by a predetermined value so as to be previously stored in the arctangent table.

The stage (A2-4) has a sub-stage of dividing the sine and cosine values into the predetermined regions and then one of the regions by a predetermined value so as to be previously stored in the first log function table, and outputting the sine and cosine values corresponding to the value resulting from subtracting a predetermined value from the accumulated value and shifting the present address region to the next region if the accumulated value is greater than the predetermined value.

At the stage (A2-3), the address value created for obtaining the sine or cosine value of the symmetric region is outputted after the complementary operation.

The step (C) comprises the sub-steps of (C1) performing the conjugate complex number calculation and accumulation of pilot signals extracted from the compensated data symbols and creating arc tangent table address by calculating the ratio of the real and imaginary parts of the accumulated value, (C2) outputting the estimated residual phase by identifying the code of the accumulated value and transforming the arctangent value of the arctangent table address to the corresponding region value, (C3) creating the second log function table address according to the estimated residual phase estimated at the sub-step (C2) and outputting the corresponding log function value, and (C4) compensating the residual phase by multiplying the data symbol with the log function value outputted at the sub-step (C3).

The sub-step (C1) has a sub-stage of dividing the arctangent value into predetermined regions and then dividing one of the regions by a predetermined value so as to previously store in the arctangent table.

The stage (C3) has a sub-stage of dividing the sine and cosine values into the predetermined regions and then one of the regions by a predetermined value so as to be previously stored in the first log function table, and outputting the sine and cosine values corresponding to the value resulting from subtracting a predetermined value from the accumulated value and shifting the present address region to the next region if the accumulated value is greater than the predetermined value.

At the stage (C3), the address value created for obtaining the sine or cosine value of the symmetric region is outputted after the complementary operation.

The frequency synchronization method of the present invention will be described, in more detail, with reference to the FIG. 1a~FIG. 11 hereinafter.

So far, a frequency synchronization method of synchronizing carrier frequency offset using the short and long training signals is described in two-step full digital approach. The general techniques used in the front-end of the receiver such as signal detection and sensing the start of symbol are not explained here.

Figure 3:
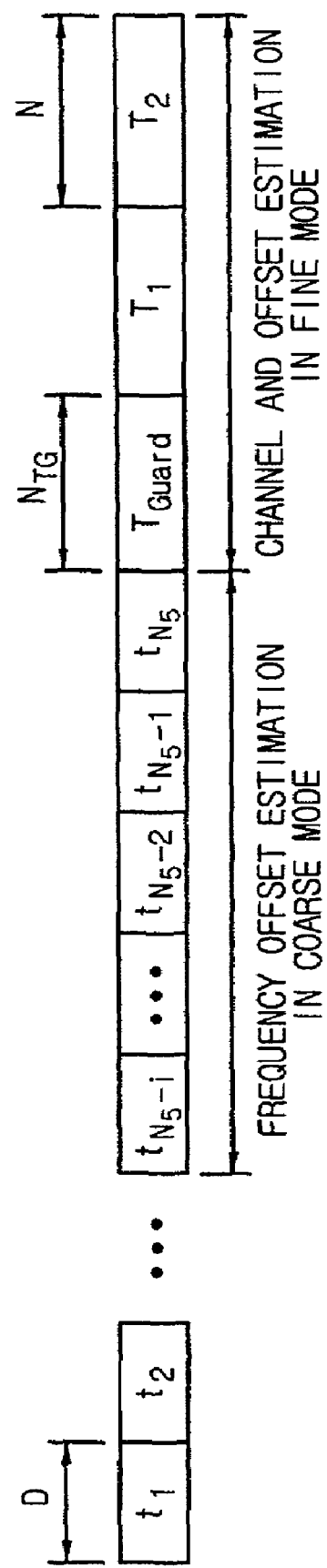
FIG. 3 shows a structure of the training signal according to the preferred embodiment of the present invention.

FIG. 3 shows a structure of the training signal according to the preferred embodiment of the present invention.

As shown in FIG. 3, the training signal used in the OFDM wireless modem includes continuous $N_s$ short training signals ($t_1$~$t_{Ns}$) of sample length D, continuous two long training signals ($T_1$, $T_2$) of sample length N, and a guard interval ($T_{GUARD}$) interposed between the sets of short and long training signals.

For example, the OFDM training structure of the IEEE 802.11a wireless LAN consists of 10 short training symbols and two long training symbols. A guard interval interposes between the sets of the short and long training symbols.

Figure 4:
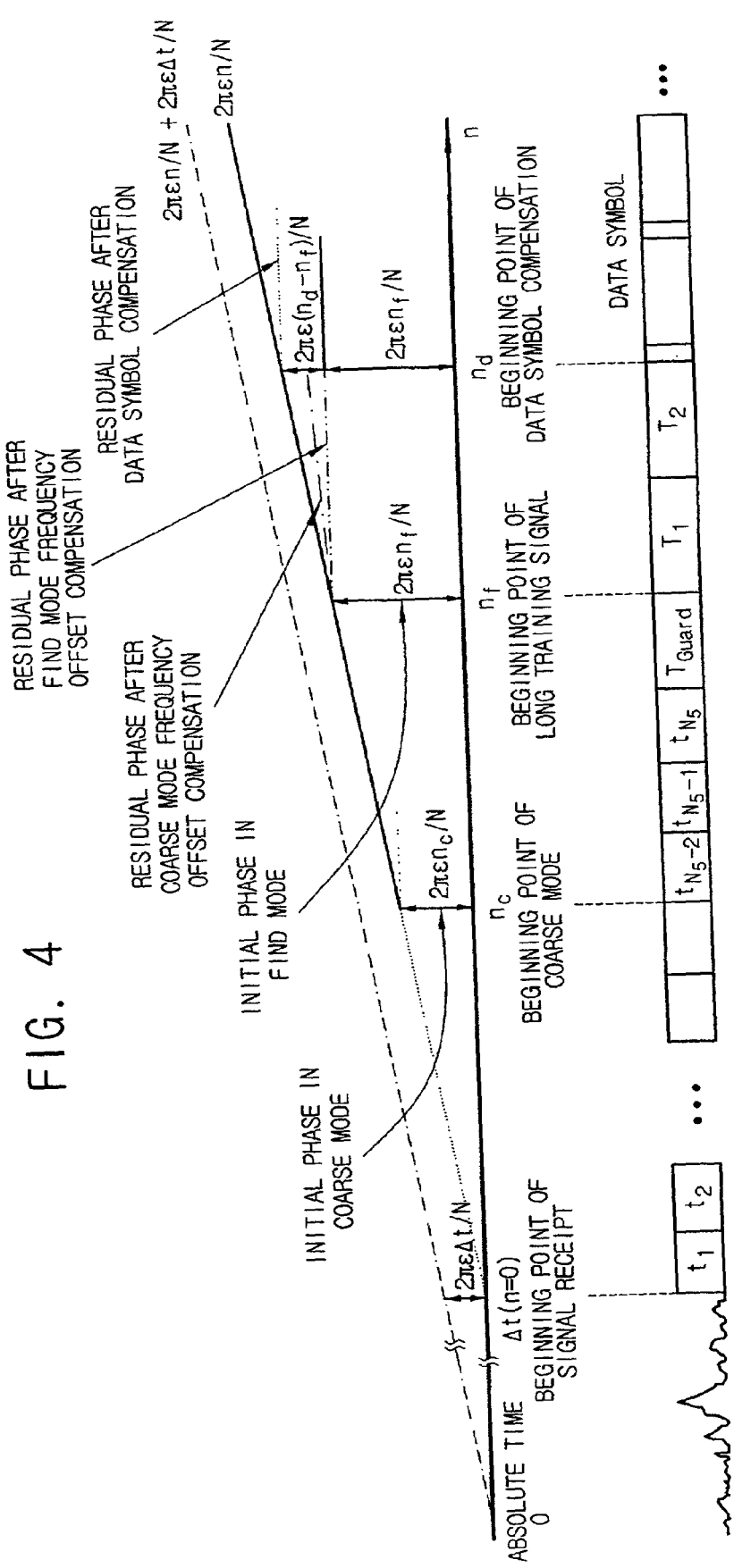
FIG. 4 is a drawing illustrating effects of the frequency offsets and an initial phase at the point of frequency compensation.

FIG. 4 is a drawing illustrating effects of the frequency offsets and an initial phase at the point of frequency offset compensation. The carrier frequency synchronization method will be described with reference to FIG. 4 and through the mathematical signal analysis.

Firstly, the short training signal of the OFDM communication system according to the preferred embodiment of the present invention is generated according to the equation 1.

$$S_s(n) = \sum_{k=0}^{N-1} S_s(k) e^{\frac{j2\pi n}{N}} \qquad \text{(Equation 1)}$$

$$n = 0, 1, 2, \ldots, N-1$$

where $S_s(k)$ is the short training symbol and N is the size of the FFT/IFFT.

The short symbol $s_s(n)$ of the period D repeats N/D times in time domain such that the short training symbols are transmitted with repetition of $N_s$, times.

Since the signal may experience the phase jitter and Doppler shift during the propagation, the short training symbol can be expressed as the following equation when the effect of the frequency offset is included.

$$r_s(n) = \sum_{k=0}^{N-1} S_s(k) H(k) e^{\frac{j2\pi(k+\varepsilon)n}{N}} e^{\frac{j2\pi\varepsilon(n_c+\Delta t)}{N}} + W(n) \qquad \text{(Equation 2)}$$

where $\varepsilon(=f_{offset}/\Delta f)$ is a normalized frequency offset and $f_{offset}$ is a frequency offset, $\Delta f$ is subcarrier spacing, and $H(k)$ is channel response $\Delta t$ is a signal reception start point (n=0), $2\pi\Delta t/N$ is initial phase rotation, $N_c$ is a coarse mode start point, and $W(n)$ is an added noise.

As shown in equation 2, since the received signal $r_s(n)$ of the period D repeats N/D times, an approximate frequency offset can be estimated using the auto correlation characteristic in the coarse mode at step S800.

In the coarse mode, the auto correlation characteristic of the short training symbols $t_{Ns-1}$~$t_{Ns}$ is used for coarsely performing carrier frequency synchronization.

The signal received at the RF module 100 is sent to the shift register part 311 via the A/D converter 200 and then the shift register part 311 delays the training symbol in the received signal such that the conjugate complex numbers of the $t_{Ns-i}$ and $t_{Ns-i-1}$ are inputted to the first multiplier 312-1 at the same time. The conjugate complex numbers are multiplied in the conjugate complex number multiplier 312-1 and then the output values from the conjugate complex number multiplier 312-1 are accumulated in the accumulator 312-2 during the period of (i+1)*D. In the coarse mode, if two short training symbols are used, the "i" becomes 0 such that the accumulation is performed during the period of D, and three short training symbols are used, the "i" becomes 2 such that the accumulation is performed during the period of 2D.

Next, the accumulated value is divided into the real and imaginary parts so as to calculate a ratio of the real part to the imaginary part such that an arc tangent table address is created using the ratio in the first divider 312-3. Consequently, the arctangent table address is stored in the argent table 312-4 in a predetermined sampling interval.

The phase converter 312-5 identifies the codes of the real and imaginary parts of the accumulated value by referring to the divider 312-3 so as to transform the arctangent value outputted from the arctangent table 312-4 into the corresponding region value and then outputs the carrier frequency offset, $\epsilon_c$, which is calculated by equation 3. Finally, the carrier frequency offset is estimated by multiplying the period N/D.

$$\hat{\epsilon}_c = \frac{N}{2\pi D}\arg\left(\sum_{n=0}^{L-1} r_s(n+D)r_s(n)^*\right)$$

$$= \frac{N}{2\pi D}\arg\left(\sum_{n=0}^{L-1} \mathrm{Im}(r_s(n+D)r_s(n)^*) \Big/ \sum_{n=0}^{L-1} \mathrm{Re}(r_s(n+D)r_s(n)^*)\right)$$

⟨Equation 3⟩ where D is a distance between two symbols.

As shown in equation 3, the estimation range of the coarse frequency offset obtained using the auto correlation after delaying the training signal sample using short training symbols is $|\hat{\epsilon}_c|<N/2D$ and the estimation accuracy depends on L(the number of samples). For example, in the IEEE 802.11a wireless LAN, the interval D is 16 such that carrier estimation range of the coarse mode is $|\hat{\epsilon}_c|<2$. However, the estimation accuracy is low because the sample of L=N/4 taking an average is relatively small.

On the other hand, if the value L is greater than the interval D between the two repeating symbols when estimating the frequency offset using more than 3 short training symbol in equation 3, the number of the samples used for frequency offset estimation increases so as to reduce the noise such that the estimation range is maintained in $|\hat{\epsilon}_c|<N/2D$ and the estimation accuracy is improved.

In the case where the frequency offset is estimated using the number of i short training symbols repeated in N/D times, the average can be taken i−1 times such that the frequency offset estimated by taking the averages of i−1 times is more accurate than that of the frequency offset obtained using just two short training signals.

For example, if the carrier frequency offset is estimated using 3 short training symbols and L is 2D, the frequency offset can be obtained by averaging the sum of the auto correlation value between the first and second short training symbols and the auto correlation value between the second and third short training symbols.

Since it is impossible to know how large the frequency offset is generated in the real environment, the frequency offset estimation must be performed in such a manner that the carrier frequency offset is roughly estimated in the coarse mode and then the frequency offset range of the long training symbol is narrowed using the estimated frequency offset of the coarse mode.

The long training symbol received through the channel is determined as equation 4.

$$r_l(n) = \sum_{k=0}^{N-1} S_l(k)H_l(k)e^{\frac{j2\pi(k+\epsilon)n}{N}} e^{\frac{j2\pi\epsilon(n_f+\Delta t)}{N}} + W_l(n)$$

$$n = 0, 1, 2, \ldots, 2N-1$$

⟨Equation 4⟩ where $S_l$ is a long training symbol, $H_l(k)$ is a frequency response of the channel, and $n_f$ is a start point of the fine mode. In equation 4, r1(n) composed of N samples repeats twice.

The frequency offset value estimated at the frequency offset estimator 310 is inputted into the first demultiplexer 330 such that the demultiplexer 330 sends the demultiplexed signals to the bit expander 321 according to the control signal S1 from the controller 10. In FIG. 1b, since the demultiplexed signals are processed with the same procedure after the bit expending process, the signal $\epsilon$ will be exemplary described without subscript for the notational convenience.

The signal from the demultiplexer 330 is shifted as much as $\log_2 N$ in the rightward direction at the bit expander 321 in order to divide the estimated value from the estimation part 310 into the sample size N for the FFT 400. Each sample is accumulated at the second accumulator 322 such that the corresponding log function table address is assigned to the sample.

The log function table address assigned at the accumulator 322 is transformed into an address in the corresponding range by referring to the code values of the bit expander 321 in the first region controller 323 such that the log function value stored in the address of the first log function table 324 is outputted.

The log function value from the first log function table 324 is multiplied by the long training signal $T_1(T_2)$ from the A/D converter 200 in the second multiplier 325 so as to compensate frequency offset.

The signal compensated by the estimated frequency offset is sent to the frequency offset compensator 310 and the second multiplier 325 by the second demultiplexer 350 according to the control signal S2 from the controller 10.

The long training symbol digitally compensated by the carrier frequency offset estimator in the coarse mode, at step 820, can be expressed as equation 5.

$$y_l(n) = r_l(n)e^{\frac{-j2\pi\hat{\epsilon}_c n}{N}}$$

$$= \sum_{k=0}^{N-1} S_l(k)H_l(k)e^{\frac{j2\pi(k+\epsilon-\hat{\epsilon}_c)n}{N}} e^{\frac{j2\pi\epsilon(n_f+\Delta t)}{N}} +$$

$$w_l(n)e^{\frac{-j2\pi\hat{\epsilon}_c n}{N}}$$

$$n = 0, 1, 2, \ldots, 2N-1$$

⟨Equation 5⟩

In equation 5, the residual frequency offset $\epsilon-\hat{\epsilon}_c$ exists, when the long training signal is compensated by the frequency offset $\hat{\epsilon}_c$ estimated in the coarse mode.

Next, by using the compensated long training signal, the frequency offset is precisely estimated in the fine mode at step S820. The frequency offset estimation in the fine mode is performed in the same manner as the frequency offset estimation in the coarse mode. In this case, the shift register part 311 delays the input signal as much as sample size N, and the block used in the coarse mode for estimating the coarse frequency offset is adopted in the following procedures.

The frequency offset can be estimated using equation 6 where the noise is ignored, and the autocorrelation of the long training signal compensated in the coarse mode is used.

$$\hat{\epsilon}_f \approx \epsilon - \hat{\epsilon}_c = \frac{1}{2\pi}\arg\left(\sum_{n=0}^{N-1} y_l(n+N)y_l(n)^*\right)$$
$$= \frac{1}{2\pi}\arg\left(\sum_{n=0}^{N-1}\mathrm{Im}(y_l(n+N)y_l(n)^*)\Big/\sum_{n=0}^{N-1}\mathrm{Re}(y_l(n+N)y_l(n)^*)\right)$$

⟨Equation 6⟩

In equation 6, the frequency offset $\hat{\epsilon}_f$ estimated in the fine mode is more accurate than that estimated in the coarse mode because more samples are used to obtain an average even though the estimation range is reduced to $-0.5 < \hat{\epsilon}_f < 0.5$.

Accordingly, the long training signal from the second demultiplexer 350 is compensated again using the frequency offset $\hat{\epsilon}_f$ estimated at the fine mode in the frequency offset compensation module 320 at step S830.

The signal compensated by the frequency offset estimator in the fine mode is expressed as equation 7.

$$z_l(n) = y_l(n)e^{\frac{-j2\pi\hat{\epsilon}_f n}{N}}$$

$$= \sum_{k=0}^{N-1} S_l(k)H_l(k)e^{\frac{j2\pi(k+\epsilon-\hat{\epsilon})n}{N}}e^{\frac{j2\pi\epsilon(n_f+\Delta t)}{N}} +$$

$$w_l(n)e^{\frac{-j2\pi\hat{\epsilon}n}{N}}$$

$$n = 0, 1, 2, \ldots, 2N-1$$

⟨Equation 7⟩

As described above, in the frequency synchronization method of the present invention, the signal can be digitally compensated using the frequency offset estimator with a broad estimation range and high precision using the coarse and fine modes. The coarse and fine modes share the same hardware for frequency offset estimation operation.

The long training signal compensated according to equation 7 is transformed in the FFT 400, and the channel estimator 450 estimates the coefficients of the equalizer 500 using the zero-forcing method at step S840.

To simplify the mathematical expression, it is assumed that the effects of noise and residual frequency offset $\epsilon-\hat{\epsilon}_c$ are ignorable. In this case, the amplitude distortion is reduced because the residual frequency offset is very small so that only the phase distortion remains.

Accordingly, the effects of the residual frequency offset remaining in the long training signal after the initial synchronization can be approximated to the following form distorted just in phase as the equation 8 if the effect from the noise is ignored.

$$Z_l(k) = FFT(z_l(n))$$

$$= \frac{1}{N}\sum_{k=0}^{N-1}\left(\sum_{k=0}^{N-1} S_l(k)H_l(k)e^{\frac{j2\pi(k+\epsilon-\hat{\epsilon})n}{N}}\right)e^{\frac{-j2\pi nk}{N}}e^{\frac{j2\pi\epsilon(n_f+\Delta t)}{N}} + W'_l(k)$$

$$\hat{H}_l(k) = \frac{Z_l(k)}{S_l(k)} \cong H_l(k)e^{\frac{j\pi(\epsilon-\hat{\epsilon})(N-1)}{N}}e^{\frac{j2\pi(n_f+\Delta t)}{N}}$$

⟨Equation 8⟩

In the equation 8, the channel estimate $\hat{H}_f(k)$ includes the initial phase rotation amont $2\pi\epsilon\Delta t$, and a fine mode initial rotation amount $2\pi\epsilon n_f/N$. The complete digital compensation of the signal can be achieved since the data symbol is compensated together with the initial phase rotation amount included in the channel estimates, even though it is difficult to estimate the initial phase rotation amount because it is unable to calculate a start point thereof.

The next data symbol inputted to the second multiplier 325 from the A/D converter 200 is compensated using the log function value corresponding to the frequency offset $\hat{\epsilon} \approx \hat{\epsilon}_f + \hat{\epsilon}_c$ resulting from multiplying the frequency offset estimated in the fine and coarse modes in the adder 340 such that the carrier frequency synchronization is achieved at step S850. In this case the adder 340 adds the frequency offsets estimated in the coarse and fine modes and sends the result to the bit expander according to the control signal S1 from the controller 10. The following processes are same in both coarse and fine mode.

When the data symbol is compensated using the log function value corresponding to the address $\hat{\epsilon} \approx \hat{\epsilon}_f + \hat{\epsilon}_c$, an ith OFDM symbol is expressed as equation 9.

$$y_i(\tilde{n}) = \sum_{k=0}^{N-1} X_i(k)H_i(k)e^{j\frac{2\pi(k+\varepsilon-\hat{\varepsilon})\tilde{n}}{N}} e^{j\frac{2\pi\varepsilon(n_d+\Delta t)}{N}} +$$ ⟨Equation 9⟩

$$w_i(\tilde{n})e^{\frac{-j2\pi\hat{\varepsilon}\tilde{n}}{N}}$$

$$n = 0, 1, \ldots, N + N_G - 1$$

where $X_i(k)$ is the data transmitted on the ith subcarrier, $H_i(k)$ is the channel response, $n_d$ is an index where the data symbol compensation starts in time domain, and $N_G$ is the size of guard interval.

As indicated in the equation 9 and FIG. 4, the positions of channel estimation using the long training signal and the data compensation using the estimated carrier frequency offset are not identical. Therefore, after data symbols compensated by the frequency offset estimator are transformed using FFT 400 at step S860 and then compensated using the estimated channel in the equalizer 500 at step S870, the same phase rotation occurs to all the data symbols. The phase rotation can be compensated by the Frequency Domain Equalizer (FEQ) 500.

Figure 5:
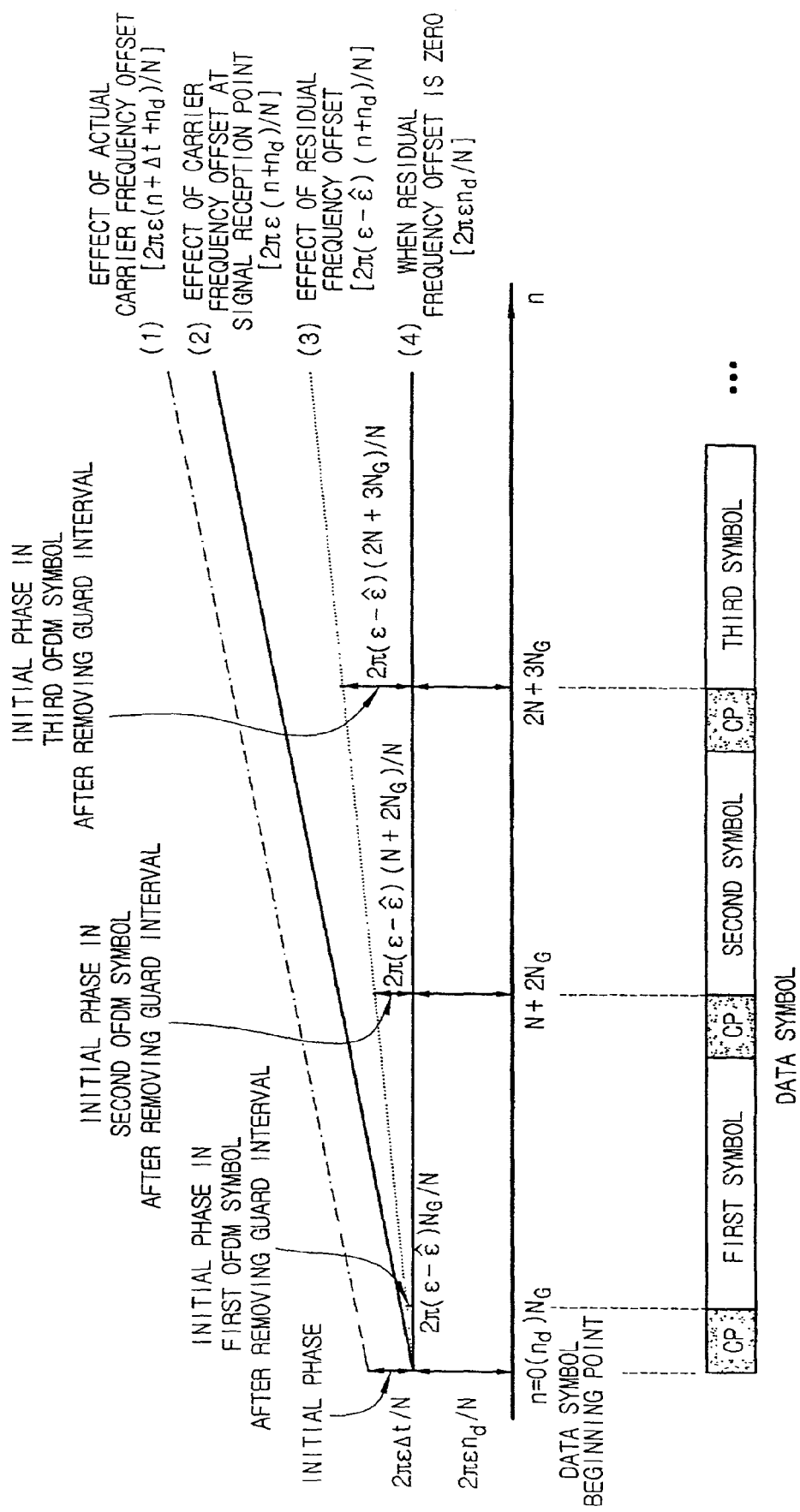
FIG. 5 is a drawing illustrating effects of carrier frequency offsets of data symbol periods.

FIG. 4 is a drawing illustrating the effects of the frequency offsets and an initial phase at the frequency offset compensation point, and FIG. 5 is a drawing illustrating the effects of carrier frequency offsets of the data symbols.

As shown in FIG. 4, even though the data symbol is compensated through the two step compensation method, the residual frequency offset exists such that the phase rotation by the residual frequency offset gives critical effect to the data symbol if the received symbols is over a predetermined number.

In this case, since the residual frequency offset remained in the $i_{th}$ OFDM symbol received during the initial synchronization process is very small, the signal transformed in the FFT after deleting the guard interval from the $i_{th}$ OFDM symbol can be expressed as equation 10, where the noise is ignored for simplifying the equation.

$$Y_i(k) = FFT(y_i(n))$$ ⟨Equation 10⟩

$$= \frac{1}{N}\sum_{k=0}^{N-1}\left(\sum_{k=0}^{N-1} X_i(k)H_i(k)e^{j\frac{2\pi(k+\varepsilon-\hat{\varepsilon})n}{N}}\right)e^{\frac{-j2\pi nk}{N}} e^{j\frac{2\pi\varepsilon(n_d+\Delta t)}{N}} + W'_i(k)$$

$$\cong X_i(k)H_i(k)e^{j\frac{2\pi(\varepsilon-\hat{\varepsilon})[N(i-1)+iN_G]+j\pi(\varepsilon-\hat{\varepsilon})(N-1)}{N}} e^{j\frac{2\pi\varepsilon(n_d+\Delta t)}{N}}$$

where $e^{j\pi\varepsilon(n_d)+\Delta t/N}$ is the initial phase where the data symbol begins, and $e^{j2\pi(\varepsilon-\hat{\varepsilon}_i)\{N(t-1)+iN_G\}/N}$ is the initial phase rotation caused by deleting the guard interval of the $i_{th}$ data symbol.

The channel distortion is compensated using the channel value estimated by equation 8. Supposed that the channel experienced by the long training signal and the channel of the data sequence are identical, i.e., $H_1(k)=H_i(k)$, the equation can be simplified as equation 11.

$$\hat{X}(k) = \frac{Y_i(k)}{\hat{H}(k)}$$ ⟨Equation 11⟩

-continued $$\cong \frac{X_i(k)H_i(k)e^{j\frac{2\pi(\varepsilon-\hat{\varepsilon})[N(i-1)+iN_G]+j\pi(\varepsilon-\hat{\varepsilon})(N-1)}{N}} e^{j\frac{2\pi\varepsilon(n_d+\Delta t)}{N}}}{H_i(k)e^{j\pi\frac{(\varepsilon-\hat{\varepsilon})(N-1)}{N}} e^{j\frac{2\pi\varepsilon(n_d+\Delta t)}{N}}}$$

$$\cong X_i(k)e^{j\frac{2\pi(\varepsilon-\hat{\varepsilon}_i)[N(i-1)+iN_G]}{N}} e^{j\frac{2\pi\varepsilon(n_d-n_f)}{N}}$$

If the residual frequency offset is 0 in equation 11, it can be much simplified as following equation.

$$\hat{X}_i(k) = X_i(k)e^{j\frac{2\pi\varepsilon(n_d-n_f)}{N}}$$ ⟨Equation 12⟩

As shown in equation 11 and equation 12, the channel estimation position $n_f$ is not identical to the data symbol compensation position $n_d$, leading to the phase rotation as much as $j2\pi\varepsilon(n_d-n_f)/N$. Note that the phase rotation caused by the residual frequency offset increases in proportional to the symbol index i.

On the other hand, if the data symbol is compensated in such a manner that the channel is estimated using the long training signal of which the carrier frequency offset is compensated in the condition of $n=n_f$ when $n=0$, and the index is increased from $n=n_d$, then the phase rotation problem in equation 11 can be solved.

However, since the phase to be compensated is $j2\pi\hat{\varepsilon}n_f$ if the index is increased from $n=n_f$ and when n is 0, additional hardware is required because the accumulator adds $n_f$ or the multiplier should be used to obtain the phase.

In the present invention, the index increases from 0 while the compensations of the long training signal and the data symbol in the time domain such that the phase to be compensated for each sample can be obtained only using the accumulator and there is no need to calculate presently how many sample periods are far from the point of signal reception.

The phase rotation at equation 12 is estimated in such a manner of estimating the phase rotation caused by the residual frequency offset in the residual estimation part 600 together with the phase rotation amount for compensating the effect of the residual frequency offset after passing the equalizer 500. Accordingly, there is no need of the additional hardware for compensating the phase rotation because the data symbol is compensated by increasing the index from 0 in time domain.

The residual estimation part 600 extracts pilot signal of each symbol in the tracking mode and compensates, in frequency domain, the phase rotation caused by the residual frequency offset existing even after the compensation of carrier frequency using the autocorrelation.

A pilot extractor 610 of the residual phase estimation part 600 extracts the pilot signal and sends the pilot signal to the first multiplier 312-1 of the selective estimation part 312 such that the selective estimation part 312 estimates the phase rotation caused by the difference between the point of the residual frequency and channel estimation and the point of the data symbol compensation in time domain at step S880. The residual phase offset can be calculated using the autocorrelation of the pilot signal in the tracking mode as equation 13.

$$\hat{\phi} = \tan^{-1}\left(\sum_{p=0}^{P-1} \hat{X}_i^p(p) X_i(p)^*\right)$$

$$= \frac{2\pi[(\varepsilon - \hat{\varepsilon})\{N(i-1) + iN_G\} + \varepsilon(n_d - n_f)]}{N}$$

⟨Equation 13⟩ where $\hat{X}_i^p(p)$ is the $p_{th}$ pilot signal in the received signal $\hat{X}_i^p(k)$, and $X_i(p)$ is the $p_{th}$ pilot signal of the $i_{th}$ OFDM symbol.

As shown in equation 13, when estimating the phase rotation by the residual frequency using the autocorrelation of the pilot signal in the tracking mode, the phase rotation caused by difference between the channel estimation point and the data symbol compensation point is also estimated.

A second region controller 621 of the residual compensation part 620 generates a second log function table address corresponding to the residual phase value from the first demultiplexer 330 of the selective estimator 312.

The second log function table 622 outputs one of the log function values which is sampled in a predetermined interval and stored therein according to the second log function address from the second region controller 621 and the third multiplier 623 compensates the log function value from the second log function table 622 by multiplying the log function value with the compensated data symbol at step S890.

The data symbol compensated in the residual phase compensation part 620 using the phase rotation value estimated to every symbols in the pilot extractor 610 and the estimation part 310 is expressed as equation 14.

$$\tilde{X}_i(k) = \hat{X}_i(k) e^{-\frac{j\hat{\phi}_i}{N}}$$

$$\cong X_i(k)$$

⟨Equation 14⟩

In equation 14, the signal passed through the residual phase compensation part 620 shows that the phase rotation caused by the difference between the residual frequency offset/channel estimation point and the data symbol compensation point is compensated.

The residual phase compensated-signal loops from the step S850 to the step S895 until it is to be the last data symbol, and then is sent to a viterbi decoder via a demodulator 700.

Even though the selective estimation part 312 is shared for reducing the hardware needed for residual phase tracking in the preferred embodiment of the present invention, another circuit identical to the selective estimation part 312 can be implemented.

Also, in the OFDM wireless burst modem using one of the training signals, its frequency synchronization method is similar to the 2 step method and the same hardware can be used.

Figure 6:
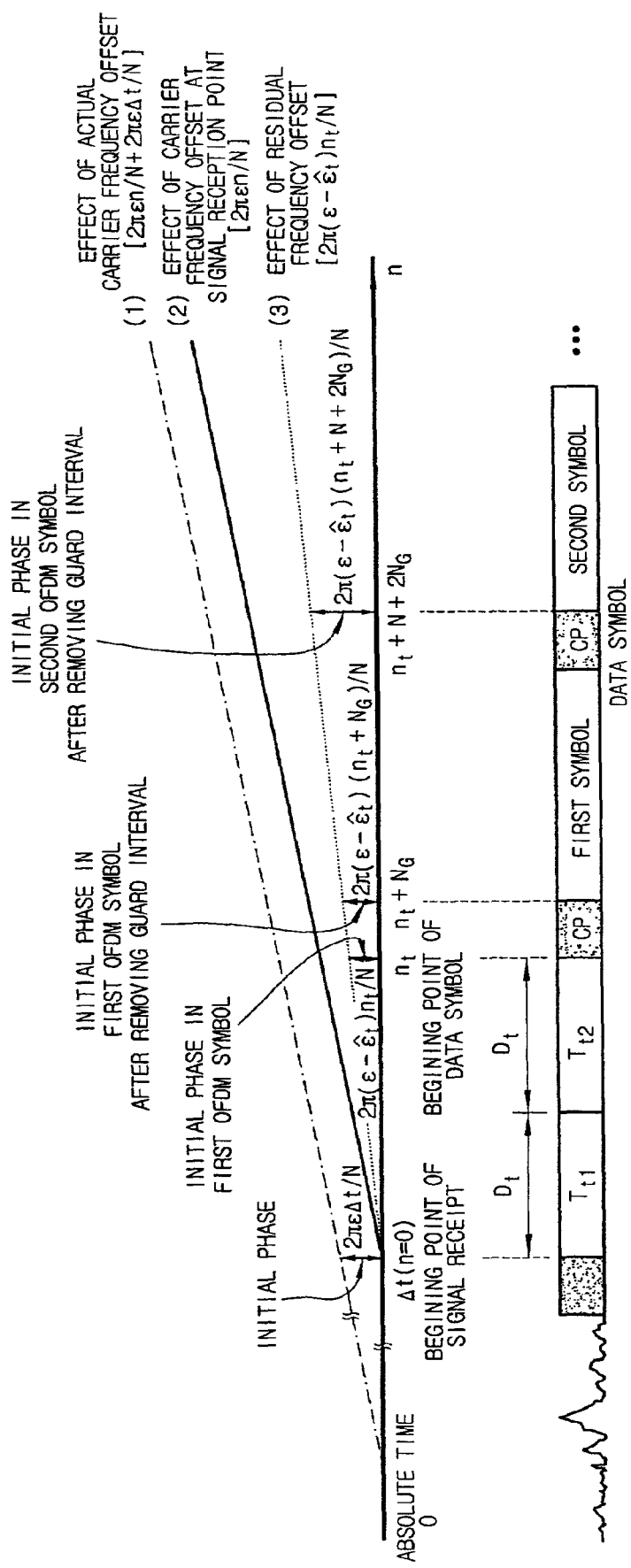
FIG. 6 is a drawing illustrating effects of the carrier frequency offsets and an initial phase at the point of frequency compensation when a single step frequency offset synchronization method is used with a single training signal.

FIG. 6 is a drawing illustrating effects of the carrier frequency offsets and an initial phase at an offset compensation point in a single step frequency offset synchronization method using one type training signal. In this case the procedure for synchronizing the carrier frequency offset using one type training signal is same with the frequency synchronization method of FIG. 2b without the coarse mode, i.e., $\hat{\varepsilon}=0$.

FIG. 1d is a block diagram illustrating the operation of the frequency synchronization part of FIG. 1b when using single training signal. In FIG. 1d the adder 340 and the second demultiplexer 350 are not depicted for simplifying the drawing.

Referring to FIG. 1d and FIG. 6, the training signal consists of $T_{t1}$ and $T_{t2}$ each having $D_t$ samples. In this case the training signal can be expressed as equation 15.

$$r_i(n) = \sum_{k=0}^{N-1} S_t(k) H_i(k) e^{\frac{j2\pi(k+\varepsilon)n}{N}} e^{\frac{j2\pi\Delta t}{N}} + w_t(n)$$

$$n = 0, 1, 2, \ldots, 2D_t - 1$$

⟨Equation 15⟩ where $S_t(k)$ is the training signal in the frequency domain and $H_t(k)$ is the frequency response of the long training signal. $\Delta t$ is the beginning point (n=0) of the signal reception and $2\pi\Delta t/N$ is the initial phase rotation.

Since the same signals are repeatedly received in $D_t$ samples, the carrier frequency offset is estimated using the autocorrelation of the received signals at step S900. The frequency offset can be expressed as equation 16.

$$\hat{\varepsilon}_t = \frac{N}{2\pi D_t} \arg\left(\sum_{n=0}^{D_t-1} r_t(n+D_t) r_t(n)^*\right)$$

$$= \frac{N}{2\pi D_t} \arg\left(\sum_{n=0}^{D_t-1} \text{Im}(r_t(n+D_t) r_t(n)^*) \bigg/ \sum_{n=0}^{D_t-1} \text{Re}(r_t(n+D_t) r_t(n)^*)\right)$$

⟨Equation 16⟩

In equation 16, the carrier frequency offset estimation range is $$|\hat{\varepsilon}_t| < N/2D_t$$

when using one type training signal. In the case of $D_t=D<N$, the estimation range is $$|\hat{\varepsilon}_t| < N/2D$$

which is the same as the estimation result obtained by using the short training signal in the 2 step frequency offset synchronization as in equation 3.

The signal compensated in the training signal and the data symbol using the estimated frequency offset $\hat{\varepsilon}_t$ can be expressed as equation 17.

$$y_i(n) = r_i(n)e^{\frac{-j2\pi\hat{\varepsilon}_t n}{N}} \qquad \text{(Equation 17)}$$

$$= \sum_{k=0}^{N-1} S_i(k)H_t(k)e^{\frac{j2\pi(k+\varepsilon-\hat{\varepsilon})n}{N}}e^{\frac{j2\pi\varepsilon\Delta t}{N}} + w_i(n)e^{\frac{-j2\pi\hat{\varepsilon}_t n}{N}}$$

$$n = 0, 1, 2, \ldots, D_t - 1$$

In equation 17, the channel can be estimated using the training signal when the training signal has only the long training signals, i.e., Dt=N. The channel estimation is performed on the basis of the FFT and zero forcing at step S920. In this case, since the effects of noise is ignored and the training signal is compensated using the estimated carrier frequency offset, the effect of the residual frequency offset remained in the training signal during the channel estimation can be approximated as in equation 18 where only the phase is distorted.

$$\hat{H}_i(k) = \frac{FFT(y_i(n))}{S_i(k)} \qquad \text{(Equation 18)}$$

$$\cong H_i(k)e^{\frac{j\pi(\varepsilon-\hat{\varepsilon})(N-1)}{N}}e^{\frac{j2\pi\varepsilon\Delta t}{N}}$$

$$k = 0, 1, \ldots, N-1$$

where $$e^{\frac{j2\pi(\varepsilon-\hat{\varepsilon})(N-1)}{N}}$$

is the phase rotation caused by the residual frequency offset. Since the channel estimation value $\hat{H}_t(k)$ includes the initial phase rotation amount $$\frac{2\pi\varepsilon\Delta t}{N}$$

like in equation 8, an unknown initial phase rotation can be compensated if the data symbol is compensated using the channel estimation value, resulting in complete digital compensation.

In the synchronization method using only one type training signal, the channel estimation point and the compensation point is same such that the phase rotation caused by the difference between the channel estimation and channel compensation points does not exist.

The $i_{th}$ received OFDM data symbol including the guard interval can be expressed as equation 19 after compensation of carrier frequency offset $\hat{\varepsilon}_t$.

$$y_i(\tilde{n}) = r_i(n)e^{\frac{-j2\pi\hat{\varepsilon}_t \tilde{n}}{N}} \qquad \text{(Equation 19)}$$

$$= \sum_{k=0}^{N-1} X_i(k)H_i(k)e^{\frac{j2\pi(k+\varepsilon-\hat{\varepsilon}_t)\tilde{n}}{N}}e^{\frac{j2\pi(\varepsilon\Delta t+(\varepsilon-\hat{\varepsilon}_t)n_i)}{N}} +$$

$$w_i(n)e^{\frac{-j2\pi\hat{\varepsilon}_t \tilde{n}}{N}}$$

$$\tilde{n} = 0, 1, \ldots, N + N_G - 1$$

where $X_i(k)$ is a signal in the frequency range of the $i_{th}$ data, $H_i(k)$ is the frequency response of the $i_{th}$ data symbol, and $n_t$ is the carrier frequency offset estimation-beginning point.

The frequency offset compensated-data symbol is transformed in the FFT at step S940, and the $i_{th}$ OFDM data symbol is equalized using the estimated channel value in the equalizer 500 at step S950. In this case, supposed that the effect of the noise is ignored and the channel does not change, i.e., $H_i(k)=H_t(k)$, the equation can be simplified as equation 20.

$$\hat{X}_i(k) = \frac{FFT(y_i(n))}{\hat{H}_t(k)} \qquad \text{(Equation 20)}$$

$$\cong \frac{X_i(k)H_i(k)e^{\frac{j2\pi(\varepsilon-\hat{\varepsilon}_i)\{N(i-1)+iN_G+n_i\}+j\pi(\varepsilon-\hat{\varepsilon})(N-1)}{N}}e^{\frac{j2\pi\varepsilon\Delta t}{N}}}{H_t(k)e^{\frac{j\pi(\varepsilon-\hat{\varepsilon})(N-1)}{N}}e^{\frac{j2\pi\varepsilon\Delta t}{N}}}$$

$$X_i(k)e^{\frac{j2\pi(\varepsilon-\hat{\varepsilon}_i)\{N(i-1)+iN_G+n_i\}}{N}}$$

where $$e^{\frac{j2\pi(\varepsilon-\hat{\varepsilon}_i)\{N(i-1)+iN_G+n_i\}}{N}}$$

is the initial phase generated by deleting the guard interval of the $i_{th}$ OFDM symbol. In equation 20, the residual frequency is very small since the data symbol is the result compensated by the estimated carrier frequency offset.

In comparison between equation 11 and equation 20, there is no phase rotation $$e^{\frac{j2\pi\varepsilon(n_d-n_f)}{N}}$$

in one step method as expressed by equation 11 because the channel estimation and compensation is performed at the same position. On the other hand, the phase rotation caused by the residual frequency offset increases in proportional to the symbol index i in the two step method as expressed by equation 20 such that the effect of the residual frequency offset causes critical problem after the number of predetermined symbols.

Accordingly, the phase tracking process for compensating the phase rotation caused by the residual frequency is performed using pilot signal included in each data symbol. The phase rotation caused by the residual frequency is estimated using the autocorrelation of the pilot signals at step S960. The phase rotation can be expressed as equation 21.

$$\hat{\phi}_i = \tan^{-1}\left(\sum_{P=0}^{P-1} \hat{X}_i(p) X_i(p)^*\right)$$
$$= \frac{2\pi(\varepsilon - \varepsilon_i)\{N(i-1)^\wedge + iN_G + n_t\}}{N}$$ (Equation 21)

where $\hat{X}_i(p)$ is the $p_{th}$ pilot signal in the received signal $\hat{X}_i(k)$ and $X_i(p)$ is the $p_{th}$ pilot symbol of the $i_{th}$ transmitted OFDM symbol.

The estimated phase rotation is compensated at step S970 and the compensated signal can be expressed as equation 22.

$$\tilde{X}_i(k) = \hat{X}_i(k) e^{\frac{-j\hat{\phi}_i}{N}}$$ (Equation 22)
$$\cong X_i(k)$$

As shown in equation 22, it is possible to digitally synchronize carrier frequency in the one step method using only the long training signal of $D_t=N$ through the same processes as in the two step method.

In case only the short training signal of $D_t=D$ is used, a measure for estimating the channel is considered even though the processes for estimating and compensating the frequency offset are same with the method using only the long training signal. Generally, since the D samples become non-zero value and N–D samples become zeros if the repeated signals are transformed by the FFT, it is impossible to calculate the channel just using the short training signal relative to all the sub-channels on the basis of the zero forcing. In this case, channel estimation should be performed using special method such as an interpolation or another training signal should be adapted for estimating the channel.

As explained above, in the apparatus and method for synchronizing frequency in the OFDM communication system, the same hardware and processes can be used in the two step method using long training and short training signals and the one step method just using short training signal or even when using short training signal in case of additional training signal being for channel estimation.

How the arctangent function table and the first and second log function tables of the present invention are implemented will be described hereinafter.

The hardware complexity and the computation accuracy of the apparatus and method for OFDM frequency synchronization of the present invention depends on the arctangent table 312-4 and the log function tables. Accordingly, it is need to reduce the size of the tables and enhance the computation accuracy.

Figure 7:
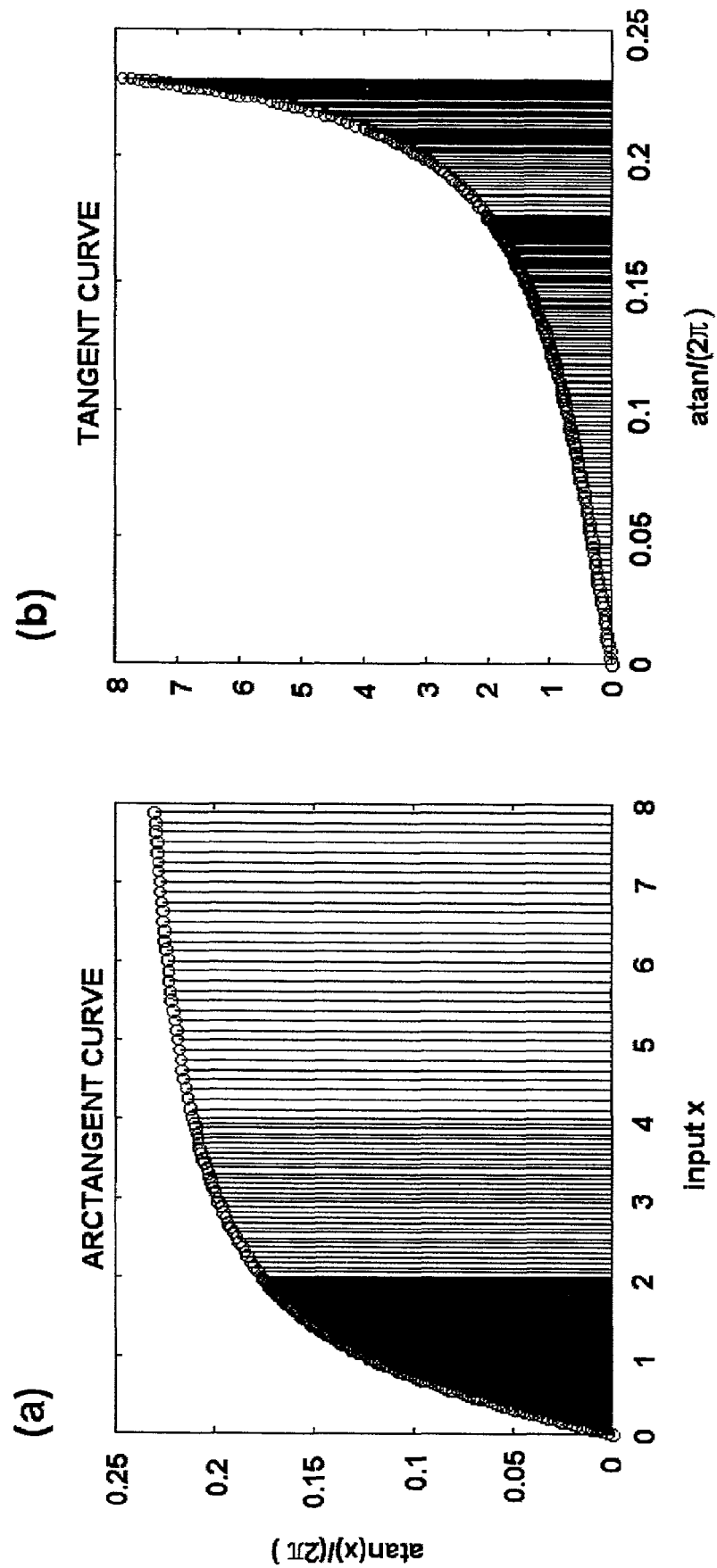
FIG. 7 shows graphs for illustrating an implementation of an arctangent table according to the preferred embodiment of the present invention.

FIG. 7 shows graphs for illustrating the implementation of an arctangent table according to the present invention.

Generally, the tangent curve repeats 4 times in its shape in the range of $[-\pi\sim\pi]$ with different signs. Accordingly, in the present invention the tangent curve in the range of $[0\sim\pi/2]$ is stored in the table and the arctangent value outputted from the phase converter 312-5 according to the signs of the real and imaginary parts of the divider 312-3.

In this case an arctangent input range corresponding to the output range $[0\sim\pi/2]$ is $[0\sim 8]$. However, since over 90% of the arctangent outputs are concentrated in the input range of $[0\sim 8]$, the arctangent input is limited to the range of $[0\sim 8]$ (see FIG. 7a) and it is preferred to take graded samples according to the gradient of the arctangent.

In equations 3 and 6, $$\frac{1}{2\pi}$$

is multiplied to the carrier frequency offset. To remove this, the data is stored after multiplied by $$\frac{1}{2\pi}$$

when arctangent table is implemented. Accordingly, the arctangent output range becomes $[1\sim 1/4]$.

Figure 8:
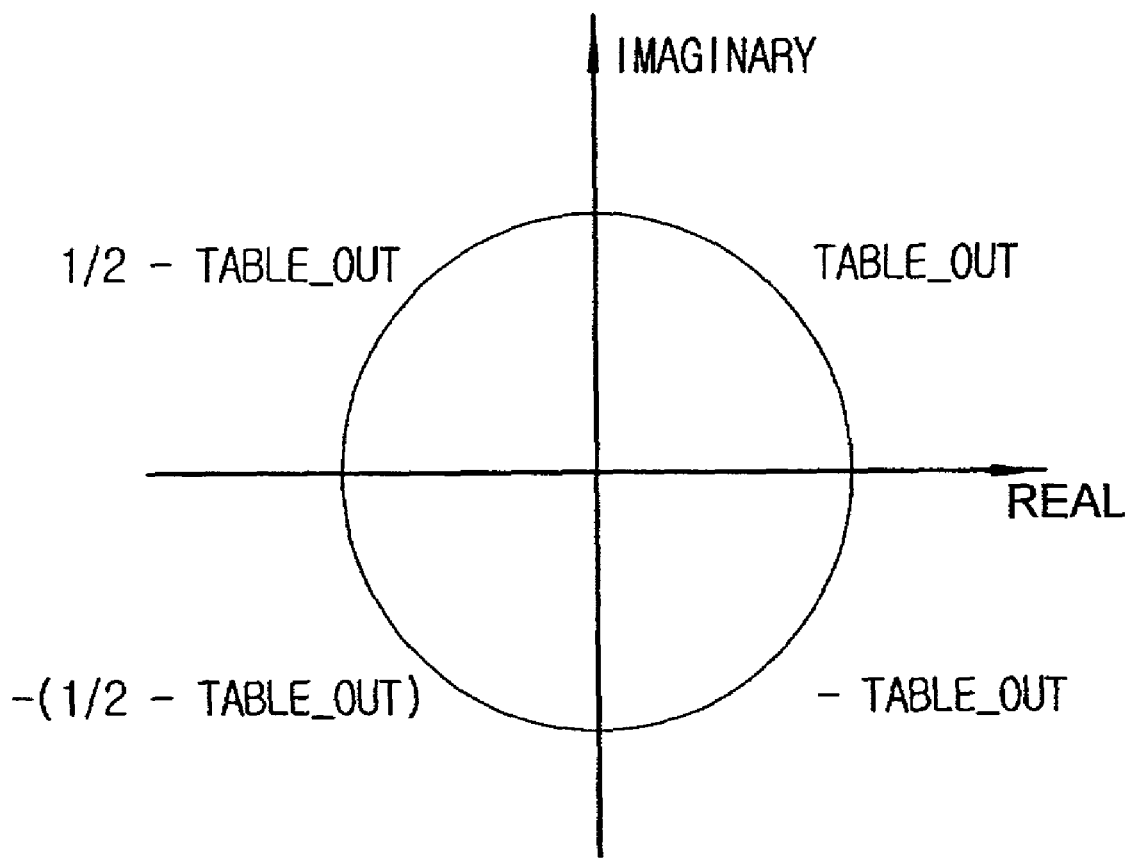
FIG. 8 is a drawing for illustrating a phase adjustment method according to the preferred embodiment of the present invention.

FIG. 8 is a drawing for illustrating a phase adjustment method of the present invention.

As explained above, since the values in the range of $[0\sim\pi/2]$ are stored in the arctangent table, the phase converter 312-5 outputs arctangent values using the signs of the real and imaginary parts of the accumulated data from the divider 312-3.

The reason why the phase adjustment standard is not $1/2\pi$ but just $1/2$ is because the output range of the arc tangent table 312-4 is $[0\sim 1/4]$.

While, a difference between the equation 3 and 6 is the part of N/D of equation 3, i.e., N/D is multiplied to the arctangent output when estimating the frequency offset in the coarse mode such that in the coarse mode the arctangent output is shifted as much as 2 bits in leftward direction. In this case an arithematical bit expansion should be executed in addition to the 2-bit shift for preventing the accuracy of the arctangent from being fallen.

The arctangent table implemented as above has a small hardware complexity and can be used in the coarse and fine modes in the same manner. Furthermore, since the outputs of the divider 312-3 correspond to the arctangent table addresses, there is no need of additional hardware for creating addresses.

On the other hand, the output of the frequency offset compensation module can be expressed as equation 23.

$$c(n) = e^{\frac{-j2\pi\hat{\varepsilon}n}{N}}$$ (Equation 23)
$$= \cos\left(\frac{2\pi\hat{\varepsilon}n}{N}\right) - j\sin\left(\frac{2\pi\hat{\varepsilon}n}{N}\right)$$

where $\hat{\varepsilon}$ is an estimated frequency offset and has a value of $\hat{\varepsilon}=\hat{\varepsilon}_c$, $\hat{\varepsilon}=\hat{\varepsilon}_f$, $\hat{\varepsilon}=\hat{\varepsilon}_f+\hat{\varepsilon}_c$, and $\hat{\varepsilon}=\hat{\varepsilon}_t$ according to the tracking mode. As shown in equation 23, the log function table consists of sine and cosine table so as to create output at every clock tick.

FIG. 9 is a pair of drawings showing the sine and cosine waveforms. As shown in FIG. 9, each of the sine and cosine curves has a wavelength which is divided into 4 regions numbered from 0 to 3. Once the log function table is created using function values in the range of [0~π/2], i.e., region 0, the function values in other regions 1, 2 and 3 can be obtained using the function values of region 0.

Also, in order to simply create the log function table, it is preferred to normalize the input values of the log function table to $2\pi$ such that the actual input range is to be [0~1/4].

As such, $2\pi$ of the equation 14 can be ignored such that the $$\frac{\hat{\epsilon}n}{N}$$

corresponds to the addresses in the sine and cosine tables and if $$\frac{\hat{\epsilon}n}{N}$$

becomes greater than 1/4 the region is shifted.

The estimated frequency offset $\hat{\epsilon}$ is accumulated in the second accumulator 322 at every clock ticks such that the second accumulator 322 creates addresses of the log function table. In this case the bit expander 321 previously divides estimation value by N such that the number of bits of the second accumulator 322 can be fixed.

Figure 10:
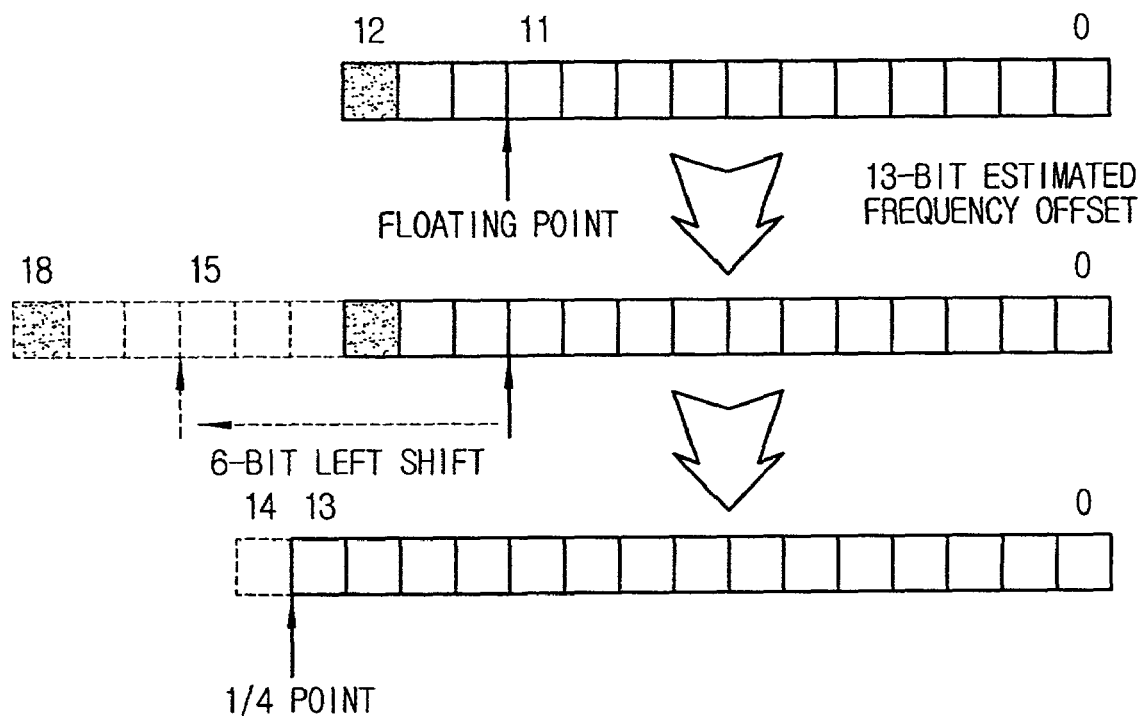
FIG. 10 is a drawing illustrating an operation of a bit expander of the frequency synchronization apparatus of FIG. 1.

FIG. 10 is a drawing for illustrating the operation of a bit expander of the frequency synchronization apparatus of the present invention.

Let's suppose that the estimated frequency offset is expressed in 13 bits, 3 bits are located left side of a floating point, and the most left bit is a sign bit.

The estimated frequency offset is shifted 6 positions to the left so as to be divided by N(=64).

Next, the left bits from the point of 1/4 is removed and 15 bits of $$\frac{\hat{\epsilon}}{N}$$

is outputted. The output of the second accumulator can be expressed as equation 24.

$$\frac{\hat{\epsilon}n}{N} = \frac{\hat{\epsilon}(n-1)}{N} + \frac{\hat{\epsilon}}{N} \qquad \langle\text{Equation 24}\rangle$$

As described above, since the input range of the sine and cosine table is [0~1/4], accurate sine and cosine function values cannot be obtained if the output from the second accumulator 322 is out of the range. However, the output value from the second accumulator 322 increases due to the every clock accumulation and this problem is solved by the first region controller 323.

Since the estimated frequency offset is inputted to the second accumulator 322 after being divided by N, the output from the second accumulator cannot be a value in other ranges. That is, if the result of accumulation to the n−1, $$\frac{\hat{\epsilon}(n-1)}{N},$$

is in the region 0, the accumulation result to n, $$\frac{\hat{\epsilon}n}{N},$$

can exist in the region 0 or region 1, but not in the region 3 or region 2. The region shift depends on whether the accumulation result is greater than 1/4 or not. This can be expressed as equation 25.

$$\begin{aligned}&\text{if } \frac{\hat{\epsilon}n}{N} \geq \frac{1}{4} \\ &\frac{\hat{\epsilon}n}{N} = \frac{\hat{\epsilon}n}{N} - \frac{1}{4} \\ &\text{region} = \text{region} + 1 \\ &\text{else} \\ &\frac{\hat{\epsilon}n}{N} = \frac{\hat{\epsilon}n}{N} \\ &\text{end},\end{aligned} \qquad \langle\text{Equation 25}\rangle$$

where "region" is a present region.

The first region controller 323 identifies the output from the second accumulator 322 and bypasses the output if the output is less than 1/4. On the other hand, if the output is greater than 1/4, the first region controller 323 generates an output by subtracting 1/4 from the output and shifts the present region to next region.

In FIG. 10, if the fourteenth position bit is 1 on actually implementing hardware, the output of the second accumulator 322 is greater than 1/4 such that the first region controller 323 can be simply implemented by resetting the fourteenth bit position to 0 and shifting the region.

Also, the function values in the region 2 where only the sign is opposite to that of the region 0 is simply obtained using the function values of the region 0. Even though the function values of the region 1 and region 3 that are symmetrically positioned to the region 0 are impossible to be directly obtained using the table, the cosine and sine values can be obtained from respective sine and cosine tables without changing the tables.

Figure 11:
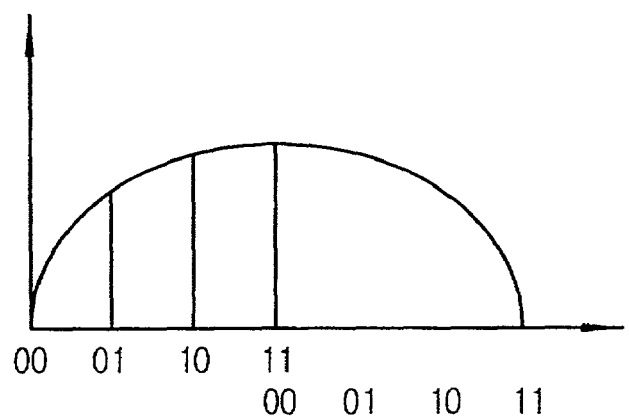
FIG. 11 is a drawing for illustrating address generation in a sine and cosine tables in accordance with region.

This will be explained with an example of a table having a size 4 with reference to FIG. 11. FIG. 11 is a drawing for illustrating address creation in a sine and cosine tables in accordance with region.

In FIG. 11, if the output of the second accumulator 322 is in the region 0 and the value of the output is 11, the next output of the second accumulator 322 becomes 100 such that the first region controller 323 performs region control. However, the output value of the address 11 is not obtained since the value of the address 00 is 0.

While, as explained in FIG. 7 the data of address 00 in the region 1 is identical to the data of address 11 in the log function table, the data of address 10 in the region 1 is identical to the data of address 01 in the log function table. That is, the output of the second accumulator 322 must be complemented before being stored as an address in the log function table. In this manner, the function values of all the regions can be obtained using the lookup table implemented with the region 0.

By implementing the frequency offset compensation module according to the above explained method, the hardware size can be reduced.

FIG. 1e is a block diagram for illustrating the residual phase tracking part wherein the imaginary part of the pilot signal is 0 and the real part of the pilot signal is 0, 1, or −1.

In FIG. 1e, the residual phase compensation part 620 has a similar structure with the frequency synchronization module 300. Since the estimation module 310 is used in initial synchronization, the estimation module is shared by the residual phase estimation part as explained above.

In case that the imaginary part of the pilot signal is 0 and the real part of the pilot signal is 0, 1, or −1 as in the IEEE 802.11a wireless LAN, the first conjugate complex number multiplier 312-1 can be replaced by a sign changing part 313. That is, the sign changing part 313 outputs 0 if the real part of the pilot signal is 0, outputs the input data as it is if the real part is 1, and outputs the input data after changing its sign into opposite sign if the real part is −1.

On the other hand, the residual phase compensation part 620 differs from the frequency offset compensation module 320 except for the sine and cosine tables. Furthermore, since the frequency offset compensation module 320 must constantly compensate the input data symbol, it can be shared by the residual phase compensation part 620. Accordingly, the residual phase compensation part 620 can be simply implemented relative to the frequency offset compensation module 320 because the phase inputted to the sine and cosine tables are not changed in one symbol time even though the residual phase compensation part 620 has the sine and cosine tables.

While this invention has been described in connection with what is presently considered to be the most practical and preferred embodiment, it is to be understood that the invention is not limited to the disclosed embodiments, but, on the equivalent arrangements included within the spirit and scope of the appended claims.

As described above, in the apparatus and method for synchronizing frequency in OFDM communication, the frequency offset estimation accuracy is enhanced as well as the frequency offset estimation range is expanded to $$|\hat{\varepsilon}| < \frac{N}{2D},$$

using the two-step estimation method with fine and coarse modes, such that the carrier frequency synchronization is completely performed in the digital domain.

Also, the hardware used in the two-step estimation method can be used in the one-step estimation method using just one kind of training signal.

Still more, even though the initial phase rotation amount $2\pi\varepsilon\Delta t$ exists in data symbol, the initial phase rotation amount $2\pi\varepsilon\Delta t$ is estimated when the channel is estimated such that the initial phase rotation amount can be compensated in the frequency domain equalizer.

Also, in the present invention, the phase rotation, $$\frac{j2\pi(n_d - n_f)}{N},$$

caused by the difference between the carrier frequency offset compensation point and the channel estimation point of the data symbol is estimated and compensated together with the phase rotation caused by the residual frequency in the residual phase estimation part in the tracking mode, such that the carrier frequency can be completely synchronized in the digital domain.

Furthermore, the estimation part and the frequency offset compensation module are shared by the residual phase tracking part in the tracking mode such that the overall implementation space of the frequency synchronization apparatus can be reduced, leading to the increase of synchronization speed.

Since the frequency offset estimation and frequency synchronization is performed in the digital domain, the frequency offset estimation and frequency synchronization circuit can be separated from analog domain part, resulting in reduction of overall manufacturing cost and high integration of the circuit.

What is claimed is:

1. A frequency synchronization apparatus for an orthogonal frequency division multiplexing (OFDM) communication system, the frequency synchronization apparatus comprising:
   a radio frequency (RF) receiver for receiving an OFDM signal;
   an analog/digital (A/D) converter connected to the RF receiver, the A/D converter converting the OFDM signal into a digital signal;
   a frequency synchronizer connected to the A/D converter, the frequency synchronizer synchronizing a carrier frequency;
   a Fast Fourier Transformer (FFT) connected to the frequency synchronizer, the FFT performing fast Fourier transformation to symbols from the frequency synchronizer;
   a channel estimator connected to the FFT, the channel estimator estimating a carrier channel;
   an equalizer connected to the FFT and the channel estimator, the equalizer configured for equalizing a channel;
   a residual phase tracker connected to the equalizer, the residual phase tracker configured for tracking a residual phase;
   a demodulator connected to the residual phase tracker, the demodulator configured for demodulating; and
   a controller connected to the frequency synchronizer, the controller controlling the frequency synchronizer,
   wherein if the received signal contains both short and long training signals, the frequency synchronizer estimates the frequency offset of the short training signal so as to compensate the long training signal with the frequency offset of the short training signal in a coarse mode, and re-estimates the frequency offset of the compensated long training signal so as to re-compensate the long training signal in a fine mode.

2. A frequency synchronization apparatus for an orthogonal frequency division multiplexing (OFDM) communica tion system, the frequency synchronization apparatus comprising:
a radio frequency (RF) receiver for receiving an OFDM signal;
an analog/digital (A/D) converter connected to the RF receiver, the A/D converter converting the OFDM signal into a digital signal;
a frequency synchronizer connected to the A/D converter, the frequency synchronizer synchronizing a carrier frequency;
a Fast Fourier Transformer (FFT) connected to the frequency synchronizer, the FFT performing fast Fourier transformation to symbols from the frequency synchronizer;
a channel estimator connected to the FFT, the channel estimator estimating a carrier channel;
an equalizer connected to the FFT and the channel estimator, the equalizer configured for equalizing a channel;
a residual phase tracker connected to the equalizer, the residual phase tracker configured for tracking a residual phase;
a demodulator connected to the residual phase tracker, the demodulator configured for demodulating; and
a controller connected to the frequency synchronizer, the controller controlling the frequency synchronizer,
wherein if the receiver signal contains one of both short and long training signals, the frequency synchronizer estimates frequency offset of the training signal and compensates the training signal and data symbol with the estimated frequency offset.

3. The frequency synchronization apparatus of claim 1 wherein frequency synchronizer compensates the data symbol with a sum of the frequency offsets estimated in the coarse and fine modes.

4. A frequency synchronization apparatus for an orthogonal frequency division multiplexing (OFDM) communication system, the frequency synchronization apparatus comprising:
a radio frequency (RF) receiver for receiving an OFDM signal;
an analog/digital (A/D) converter connected to the RF receiver, the A/D converter converting the OFDM signal into a digital signal;
a frequency synchronizer connected to the A/D converter, the frequency synchronizer synchronizing a carrier frequency;
a Fast Fourier Transformer (FFT) connected to the frequency synchronizer, the FFT performing fast Fourier transformation to symbols from the freauency synchronizer;
a channel estimator connected to the FFT, the channel estimator estimating a carrier channel;
an equalizer connected to the FFT and the channel estimator, the equalizer confiqured for equalizing a channel;
a residual phase tracker connected to the equalizer, the residual phase tracker configured for tracking a residual phase;
a demodulator connected to the residual phase tracker, the demodulator configured for demodulating; and
a controller connected to the frequency synchronizer, the controller controlling the frequency synchronizer,
wherein the frequency synchronizer comprises:
an estimator for estimating frequency offset and residual phase of a received signal;

a first demultiplexer for selectively outputting the frequency offset and residual phase estimated in the estimator;
an adder for adding the frequency offsets from the first demultiplexer;
a frequency offset compensator for compensating the received signal and data symbol using the frequency offsets from the first demultiplexer and the adder; and
a second demultiplexer for selectively outputting a compensated signal from the frequency offset compensator.

5. The frequency synchronization apparatus of claim 4 wherein the estimator comprises:
a shift register for delaying a sample of the training signal and outputting conjugate complex numbers of a predetermined training signal and a following training signal at the same time; and
a selective estimator for estimating frequency offset of a signal from the shift register and residual phase of a signal from the residual phase tracker.

6. The frequency synchronization apparatus of claim 5 wherein the selective estimator comprises:
a first multiplier for multiplying the conjugate complex numbers of the signal from the shift register or the residual phase tracker;
a first accumulator for accumulating samples obtained by multiplication of the conjugate complex numbers at the first multiplier;
a divider for generating an arctangent table address on the basis of a ratio of a real part to an imaginary part of a value accumulated at the first accumulator;
an arctangent table that stores arctangent values sampled in a predetermined interval for outputting a corresponding arctangent value to the arctangent table address generated by the divider; and
a phase converter for converting the arctangent value into a value of a corresponding region by referring to a sign of the accumulated value at the first accumulator and outputting the value as an estimated frequency offset.

7. The frequency synchronization apparatus of claim 6 wherein the arctangent table is configured by classifying the arctangent values into predetermined regions and storing the values in a representative one of the regions as representative values.

8. The frequency synchronization apparatus of claim 4 wherein the frequency offset compensator comprises:
a bit expander for sampling the estimated frequency offset;
a second accumulator for generating a first log function table address by accumulating frequency offset of each sample obtained at the bit expander;
a first region controller for converting the first log function table address into a corresponding address value in a predetermined region by referring to a sign of value at the bit expander;
a first log function table for outputting a previously stored log function value according to the address value from the first region controller; and
a second multiplier for compensating frequency offset by multiplying the training signal or the data symbol by the log function value from the first log function table.

9. The frequency synchronization apparatus of claim 8 wherein the first log function table is configured by dividing sine and cosine values into predetermined regions and storing values in one of the regions as representative values corresponding to the values in the other regions.

10. The frequency synchronization apparatus of claim 9 wherein the first region controller outputs an address value resulting from a subtraction of a predetermined value from an output value and then shifts the present region to a next region if the output value is greater than the predetermined value.

11. The frequency synchronization apparatus of claim 9, wherein the first region controller performs a complementary operation with the output value of the second accumulator for obtaining a sine or cosine value in the representative regions.

12. A freguency synchronization apparatus for an orthogonal freguency division multiplexing (OFDM) communication system, the freguency synchronization apparatus comprising:
  a radio freauency (RF) receiver for receiving an OFDM signal;
  an analog/digital (A/D) converter connected to the RF receiver, the A/D converter converting the OFDM signal into a digital signal;
  a freguency synchronizer connected to the A/D converter, the freguency synchronizer synchronizing a carrier freguency;
  a Fast Fourier Transformer (FFT) connected to the freguency synchronizer, the FFT performing fast Fourier transformation to symbols from the freguency synchronizer;
  a channel estimator connected to the FFT, the channel estimator estimating a carrier channel;
  an egualizer connected to the FFT and the channel estimator, the egualizer configured for egualizing a channel;
  a residual phase tracker connected to the equalizer, the residual phase tracker configured for tracking a residual phase;
  a demodulator connected to the residual phase tracker, the demodulator configured for demodulating; and
  a controller connected to the frequency synchronizer, the controller controlling the frequency synchronizer,
  wherein the residual phase tracker comprises:
  a pilot extractor for extracting a pilot signal from a data symbol transformed by the FFT and sending the pilot signal to the frequency synchronizer;
  a residual phase compensator for compensating the data symbol with the residual phase of the data symbol estimated at the frequency synchronizer.

13. The freguency synchronization apparatus of claim 12 wherein the residual phase compensator comprises:
  a second region controller for outputting a second log function table address corresponding to the residual phase value from the first demultiplexer;
  a second log function table for outputting a previously stored log function value corresponding to the log function table address from the second region controller; and
  a third multiplier for compensating the residual phase by multiplying the log function value from the second log function table with the compensated data symbol.

14. The frequency synchronization apparatus of claim 13 wherein the second log function table is configured by dividing sine and cosine values into predetermined regions and values in one of the regions are stored as representative values corresponding to the values in the other regions.

15. The frequency synchronization apparatus of claim 14 wherein the second region controller outputs an address value resulting from a subtraction of a predetermined value from an output value and then shifts the present region to a next region if the output value is greater than the predetermined value.

16. The frequency synchronization apparatus of claim 15 wherein the second region controller performs a complementary operation with the output value of the second accumulator for obtaining a sine or cosine value in the representative region.

17. A frequency synchronization method for an orthogonal frequency division multiplexing (OFDM) communication system comprising:
  estimating a frequency offset of a training signal;
  compensating a frequency of the training signal with the estimated frequency offset;
  performing fast Fourier transformation on the frequency;
  compensating a data symbol of an input signal with the estimated frequency offset;
  performing fast Fourier transformation on the data symbol;
  compensating the data symbol with the estimated channel obtained by performing the fast Fourier transformation;
  tracking a residual phase of the estimated data symbol; and
  compensating the residual phase.

18. The frequency synchronization method of claim 17 wherein the estimating of the frequency offset, if the training signal has short and long training signals, comprises:
  estimating the frequency offset using the short training signal;
  compensating the long training signal with the estimated frequency offset of the short training in a coarse mode;
  estimating a frequency offset of the long compensated training signal; and
  re-compensating the compensated long training signal with the estimated frequency offset in a fine mode.

19. A frequency synchronization method of claim 18 wherein the data symbol is compensated with a sum of the frequency offsets estimated in the fine and coarse modes.

20. The frequency synchronization method of claim 18 wherein the estimating of the frequency offset using the short training signal, comprises:
  delaying a sample of the short training signal;
  outputting conjugate complex numbers of a present training signal and a following training signal at the same time;
  multiplying the conjugate complex numbers of the short training signal;
  accumulating values of the samples obtained by the multiplying;
  first generating an arctangent table address on the basis of a ratio of a real and imaginary parts of the accumulated values;
  referring to a sign of the accumulated value;
  converting an arctangent value stored in the first generated arctangent table address of a generated arctangent table into a value in a corresponding region; and
  outputting the value as an estimated frequency offset.

21. The frequency synchronization method of claim 20 wherein compensating the lone training signal with the estimated frequency offset of the short training in a coarse mode comprises:
  sampling the estimated frequency offset in a predetermined size;
  accumulating values of samples;
  generating a first log function table address on the basis of the accumulated value;
  referring to a sign of the accumulated value;
  converting a first log function table address into an address in a corresponding region; and first outputting a log function stored at the converted address.

22. The frequency synchronization method of claim 21 wherein the first output log function value is multiplied with the long training signal.

23. The frequency synchronization method of claim 20 wherein the first generated arctangent table is configured by classifying the arctangent values into predetermined regions and storing the values in a representative one of the regions as representatives.

24. The frequency synchronization method of claim 21 wherein the log function value is outputted after a complementary operation for obtaining a sine or cosine value in symmetrical regions.

25. The frequency synchronization method of claim 21 wherein the first log function table is configured such that dividing sine and cosine values into predetermined regions and values in one of the regions are stored as representative values corresponding to the values in the other regions.

26. The frequency synchronization method of claim 21 wherein an address value resulting from a subtraction of a predetermined value from an output value is outputted and then the present region is shifted to a next region if the output value is greater than the predetermined value.

27. The frequency synchronization method of claim 21 wherein estimating a freguency offset of the long compensated training signal comprises:
   delaying a sample of the compensated long training signal;
   outputting conjugate complex numbers of a present long training signal and a following training signal at the same time;
   multiplying the conjugate complex numbers of the long training signal;
   accumulating values of samples obtained by multiplication of the conjugate complex numbers of the long training signal;
   second generating an arctangent table address on the basis of a ratio of real and imaginary parts of the accumulated value obtained by multiplication of the conjugate complex numbers of the long training signal;
   referring to a sign of the accumulated value;
   converting the arctangent value stored in the second generated arctangent table address of an arctangent table into a value in a corresponding region; and
   outputting the value as an estimated frequency offset.

28. The frequency synchronization method of claim 27 wherein the re-compensating comprises:
   sampling the estimated frequency offset in a predetermined size;
   accumulating values of samples;
   generating a log function table address on the basis of the accumulated value;
   referring to a sign of the accumulated value;
   converting a first log function table address of a first log function table into an address in a corresponding region; and
   second outputting a log function value stored at the converted address.

29. The frequency synchronization method of claim 28 wherein the second output log function value is multiplied with the long training signal.

30. The frequency synchronization method of claim 27 wherein the arctangent table is configured classifying the arctangent values into predetermined regions and storing the values in a representative one of the regions as representatives.

31. The frequency synchronization method of claim 28 wherein the log function value is outputted after a complementary operation for obtaining a sine or cosine value in symmetrical regions.

32. The frequency synchronization method of claim 28 wherein the first log function table is configured such that dividing sine and cosine values into predetermined regions and values in one of the regions are stored as representative values corresponding to the values in the other regions.

33. The frequency synchronization method of claim 28 wherein an address value resulting from a subtraction of a predetermined value from an output value is outputted and then the present region is shifted to a next region if the output value is greater than the predetermined value.

34. The frequency synchronization method of claim 17 wherein tracking a residual phase comprises:
   extracting a pilot signal from the compensated data symbol;
   performing a conjugate complex number multiplication;
   accumulating values of samples obtained by the complex number multiplication;
   generating an aretangent table address on the basis of a ratio of real and imaginary parts of the accumulated value;
   referring to a sign of the accumulated value;
   converting the arctangent value stored in the generated arctangent table address of an arctangent table into a value in a corresponding region;
   outputting the value as an estimated residual phase;
   generating a second log function table address according to the estimated residual phase;
   outputting a log function value corresponding to the second log function table address of a second log function table; and
   multiplying the log function value with the data symbol.

35. The frequency synchronization method of claim 34 further comprising classifying the arctangent values into predetermined regions and storing the values in a representative one of the regions as representative values.

36. The frequency synchronization method of claim 34 the second log function table further comprising dividing sine and cosine values into predetermined regions and storing values in one of the regions as representative values corresponding to the values in the other regions.

37. The frequency synchronization method of claim 34 further comprising outputting an address value resulting from a subtraction of a predetermined value from an output value and shifting the present region to a next region if the output value is greater than the predetermined value.

38. The frequency synchronization method of claim 34 further comprising outputting sine and cosine values after performing a complementary operation with the log function value for obtaining sine or cosine value in symmetrical regions.

* * * * *

UNITED STATES PATENT AND TRADEMARK OFFICE
CERTIFICATE OF CORRECTION

| | |
|---|---|
| PATENT NO. | : 7,068,593 B2 |
| APPLICATION NO. | : 09/994568 |
| DATED | : June 27, 2006 |
| INVENTOR(S) | : Y.S. Cho et al. |

Page 1 of 1

It is certified that error appears in the above-identified patent and that said Letters Patent is hereby corrected as shown below:

At column 25, line 51 (claim 4, line 15) of the printed patent, "freauency" should be --frequency--.

At column 30, line 27 (claim 34, line 8) of the printed patent, "aretangent" should be --arctangent--.

Signed and Sealed this

Sixth Day of March, 2007

JON W. DUDAS
*Director of the United States Patent and Trademark Office*